US008248982B2

(12) United States Patent
Abhishek et al.

(10) Patent No.: US 8,248,982 B2
(45) Date of Patent: *Aug. 21, 2012

(54) WIRELESS SUPPORT FOR PORTABLE MEDIA PLAYER DEVICES

(75) Inventors: Abhishek Abhishek, Sammamish, WA (US); Hui Shen, Sammamish, WA (US); Jiandong Ruan, Sammamish, WA (US); Yasser Asmi, Redmond, WA (US); David Proctor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/953,647

(22) Filed: Nov. 24, 2010

(65) Prior Publication Data
US 2011/0064012 A1    Mar. 17, 2011

Related U.S. Application Data

(63) Continuation of application No. 11/542,382, filed on Oct. 3, 2006, now Pat. No. 7,860,038.

(60) Provisional application No. 60/835,617, filed on Aug. 4, 2006.

(51) Int. Cl.
*G08C 17/00* (2006.01)
(52) U.S. Cl. ........ 370/311; 370/318; 370/346; 370/347; 370/348; 370/448; 455/41.2; 455/515; 455/522
(58) Field of Classification Search .................. 370/310, 370/311, 318, 338, 346–348, 445, 448, 449; 455/41.2, 500, 507, 515, 516, 522, 574
See application file for complete search history.

(56) References Cited

U.S. PATENT DOCUMENTS

| 6,307,843 | B1 | 10/2001 | Okanoue |
| 6,421,717 | B1 | 7/2002 | Kloba et al. |
| 6,791,949 | B1 | 9/2004 | Ryu et al. |
| 6,842,460 | B1 | 1/2005 | Olkkonen et al. |
| 6,865,371 | B2 | 3/2005 | Salonidis et al. |
| 6,892,230 | B1 | 5/2005 | Gu et al. |
| 6,907,238 | B2 | 6/2005 | Leung |
| 6,950,628 | B1 | 9/2005 | Meier et al. |
| 7,286,515 | B2 | 10/2007 | Olson et al. |
| 7,298,716 | B2 | 11/2007 | Abraham et al. |

(Continued)

FOREIGN PATENT DOCUMENTS

EP    1 241 838 A2    9/2002

(Continued)

OTHER PUBLICATIONS

Chandra, et al., "MultiNet: Connecting to Multiple IEEE 802.11 Networks Using a Single Wireless Card", http://research.microsoft.com/~bahl/ms_projects/multinet/infocom.pdf, Aug. 2003.

(Continued)

*Primary Examiner* — Rafael Pérez-Gutiérrez
*Assistant Examiner* — Yungsang Lau

(57) ABSTRACT

A portable media player device is capable of operating in a wireless network. The wireless portable media player device can bootstrap and synchronize with an ad hoc network with low power consumption. Neighbor portable media player devices in an ad hoc network can be discovered by the wireless portable media player device. The portable media player device can establish and terminate connections to neighbor portable media player devices. The portable media player device can transfer data in a high speed data transfer mode or a power save data transfer mode, while concurrently permitting discovery by other devices. The portable media player device operates in a power save mode during an inactive portion of a periodic discovery interval.

20 Claims, 15 Drawing Sheets

U.S. PATENT DOCUMENTS

| | | |
|---|---|---|
| 7,385,958 B2 | 6/2008 | Demirhan |
| 7,400,899 B2 | 7/2008 | Shin et al. |
| 7,436,790 B2 | 10/2008 | Todd et al. |
| 2003/0054795 A1 | 3/2003 | Tamaki et al. |
| 2003/0096576 A1 | 5/2003 | Salonidis |
| 2003/0179742 A1 | 9/2003 | Ogier et al. |
| 2004/0028060 A1 | 2/2004 | Kang |
| 2004/0042434 A1 | 3/2004 | Kennedy |
| 2004/0152416 A1 | 8/2004 | Dahl |
| 2004/0203385 A1 | 10/2004 | Narayanan et al. |
| 2004/0216125 A1 | 10/2004 | Gazda |
| 2004/0223469 A1 | 11/2004 | Bahl et al. |
| 2004/0228293 A1 | 11/2004 | Choi et al. |
| 2004/0233881 A1 | 11/2004 | Kang et al. |
| 2004/0253996 A1 | 12/2004 | Chen et al. |
| 2005/0009565 A1 | 1/2005 | Kwak |
| 2005/0041627 A1 | 2/2005 | Duggi |
| 2005/0089010 A1 | 4/2005 | Rue et al. |
| 2005/0117530 A1 | 6/2005 | Abraham et al. |
| 2005/0135302 A1 | 6/2005 | Wang et al. |
| 2005/0148315 A1 | 7/2005 | Sawada |
| 2005/0177639 A1 | 8/2005 | Reunamaki et al. |
| 2005/0186949 A1 | 8/2005 | Ho |
| 2005/0198337 A1 | 9/2005 | Sun et al. |
| 2005/0240665 A1 | 10/2005 | Gu et al. |
| 2005/0249137 A1 | 11/2005 | Todd et al. |
| 2005/0250487 A1 | 11/2005 | Miwa et al. |
| 2005/0286478 A1 | 12/2005 | Mela et al. |
| 2005/0286480 A1 | 12/2005 | Akiyama |
| 2006/0002349 A1 | 1/2006 | Demirhan |
| 2006/0039450 A1 | 2/2006 | Fulton et al. |
| 2006/0041561 A1 | 2/2006 | Singer et al. |
| 2006/0062220 A1 | 3/2006 | Suga |
| 2006/0067290 A1 | 3/2006 | Miwa et al. |
| 2006/0094476 A1 | 5/2006 | Guy |
| 2006/0120301 A1 | 6/2006 | Falck et al. |
| 2006/0155836 A1 | 7/2006 | Chang et al. |
| 2006/0215601 A1 | 9/2006 | Vleugels et al. |
| 2007/0189249 A1 | 8/2007 | Gurevich et al. |
| 2007/0248065 A1 | 10/2007 | Banerjea et al. |
| 2008/0031208 A1 | 2/2008 | Abhishek et al. |
| 2008/0031209 A1 | 2/2008 | Abhishek et al. |
| 2008/0031210 A1 | 2/2008 | Abhishek et al. |
| 2008/0049688 A1 | 2/2008 | Nakfour et al. |

FOREIGN PATENT DOCUMENTS

| | | |
|---|---|---|
| EP | 1 569 411 A1 | 8/2005 |
| JP | 2005-244329 | 9/2005 |
| RU | 2231930 C2 | 6/2004 |
| RU | 2273956 C2 | 4/2006 |
| RU | 2273964 C2 | 4/2006 |
| RU | 2005102111 | 3/2007 |
| WO | WO 03/058881 A2 | 7/2003 |
| WO | WO 2004/098126 A1 | 11/2004 |
| WO | WO 2004/098128 A1 | 11/2004 |
| WO | WO 2007/002364 A2 | 1/2007 |

OTHER PUBLICATIONS

Kutscher, et al., "Dynamic Device Access for Mobile Users", http://www.informatik.uni-bremen.det/~dku/pub/pwc2003-kutscher-dda.pdf, Sep. 2003.

Rekimoto, Jun, "SyncTap: synchronous user operation for spontaneous network connection", May 1, 2004, pp. 126-134, http://www.csl.sony.co.ip/person/rekimoto/papers/syncubi.pdf.

Stajano, et al., "The Resurrecting Duckling: Security Issues for Ad-hoc Wireless Networks", 1999, http://www2.ufp.pt/~rmoreira/SA1/05_The ResurrectingDucklingSecurityIssuesAdHocWire.

Chatschik Bisdikian, IBM Research Report: An Overview of the Bluetooth Wireless Technology, Jun. 25, 2001; http://cpscenter.future.co.kr/resource/hot-topic/wpan/RC22109.pdf.

Rekimoto, et al., "Proximal Interactions: A Direct Manipulation Technique for Wireless Networking", 2003, pp. 511-518, IOS Press, http://www.idemployee.id.tue.pl/a_w_m_rauterberg/conferences/INTERACT2003/INTERA.

Salonidis, et al., "Proximity awareness and fast connection establishment in Bluetooth", http://www.ece.umd.edu/~thsalon/publications/mobihoc00e.PDF, 2000.

Tseng, et al., "Power-Saving Protocols for IEEE 802.11-BasedMulti-Hop Ad Hoc Networks", 2002, http://www.iks.inf.ethz.ch/education/ss04/seminar/23.pdf.

*A Randomized Power Management Protocol with Dynamic Listen Interval for Wireless Ad Hoc Networks*, Zi-Tsan Chou; Vehicular Technology Conference, 2006, VTC 2006-Spring, IEEE 63rd, vol. 3, May 7-10, 2006 pp. 1251-1255 See the abstract, section II 1)-3), and section III.

*Joint synchronization, routing and energy saving in CSMA/CA multi-hop hybrid networks*, Jurca, D.; Hubaux, J-P.; Mobile Ad-hoc and Sensor Systems, 2004 IEEE International Conference on Mobil Ad-hoc and Sensor Systems, Oct. 25-27, 2004 pp. 245-254 See the abstract and section III.

*Power Management Mechanism for routing in Ad-Hoc Wireless Networks*, Zabian, Arwa; Mobile computing and Wireless Communication International Conference, 2006. MCWC 2007. Proceedings of the First, Sep. 17-20, 2006 pp. 44-49 (PA) See the abstract and section II, III.

International Search Report and Written Opinion mailed Jan. 22, 2008 from International Application No. PCT/US2007/017520.

International Search Report and Written Opinion mailed Jan. 16, 2008 from International Application No. PCT/US2007/017507.

International Search Report and Written Opinion mailed Mary 6, 2008 from International Application No. PCT/US2007/017508.

Anastasi G. et al., "IEEE 802.11 Ad Hoc Networks: Protocols, Performance, and Open Issues", in "Mobile Ad Hoc Networking", 2004, IEEE Press, Piscataway, NJ, pp. 69-116, XP55003395.

IEEE Std 802.11: Wireless LAN Medium Access Control (MAC) and Physical Layer (PHY) Specifications, IEEE Standard, Aug. 1, 2005, pp. 1-721, XP017603987.

Extended Search Report dated Aug. 9, 2011 from corresponding European Patent Application No. 07836559.0.

Extended Search Report dated Aug. 8, 2011 from European Patent Application No. 07836572.3.

Extended Search Report dated Aug. 9, 2011 from European Patent Application No. 07836560.8.

WIRELESS SUPPORT FOR PORTABLE MEDIA PLAYER DEVICES

CROSS-REFERENCE TO RELATED APPLICATIONS

This application is a continuation of U.S. patent application Ser. No. 11/542,382, filed Oct. 3, 2006, which claims the benefit of Provisional Application Ser. No. 60/835,617, filed Aug. 4, 2006, which are hereby incorporated by reference in their entirety.

This application is related to the following applications, which are hereby incorporated by reference in their entirety.

1. Provisional Application Ser. No. 60/835,614, filed Aug. 4, 2006 and entitled "MANAGING ASSOCIATIONS IN AD HOC NETWORKS."

2. Provisional Application Ser. No. 60/835,618, filed Aug. 4, 2006 and entitled "SYNCHRONIZATION BETWEEN WIRELESS DEVICES WHILE SAVING POWER."

TECHNICAL FIELD

This invention relates to wireless networks and, more particularly, to ad hoc networks of wireless devices that are in proximity to each other. The invention is particularly useful for portable media player devices, but is not limited to such devices.

BACKGROUND

In a typical wireless network, one or more wireless devices are associated with a common wireless access point, which may be connected to a wired network. Communication between wireless devices is through the access point. Such operation is known as the infrastructure operating mode.

The IEEE 802.11 standard for wireless local area networks (LANs) provides for an ad hoc operating mode in which wireless devices communicate directly with each other without the use of a wireless access point or a wired network. However, in order to operate an ad hoc network, the wireless devices require mechanisms to discover other wireless devices in proximity, mechanisms to establish connections to the other wireless devices and mechanisms to transfer data among the wireless devices. Such mechanisms should have low power consumption, should create limited radio interference and should have high throughput.

SUMMARY

The invention provides methods, apparatus and computer-readable media for supporting wireless operation of a portable media player device in an ad hoc network. The wireless portable media player device can bootstrap and synchronize with an ad hoc network with low power consumption. Neighbor portable media player devices in the ad hoc network can be discovered by the wireless portable media player device. The portable media player device can establish and terminate connections to neighbor wireless portable media player devices. In some embodiments, a wireless device can transfer data in a high speed data transfer mode or a power save data transfer mode, while concurrently permitting discovery by other wireless devices. In further embodiments, the invention provides mechanisms for a portable media player device to discover neighbor wireless devices, to establish connections and to transfer data in an ad hoc network. The portable media player device operates in a power save mode during an inactive portion of a periodic discovery interval.

According to a first aspect of the invention, a method to operate a wireless device in an ad hoc network is provided. The method comprises: transmitting and receiving discovery information by the wireless device during a discovery window of a periodic discovery interval; and operating the wireless device in a power save mode during an inactive portion of the periodic discovery interval.

According to a second aspect of the invention, a wireless portable media player device is provided. The wireless portable media player device comprises: a portable media player; a radio to permit wireless operation; and a wireless module logically connected to the portable media player and to the radio to operate the wireless portable media player device in an ad hoc network. The wireless module comprises a processor programmed with instructions for: transmitting and receiving discovery information during a discovery window of a periodic discovery interval; and operating in a power save mode during an inactive portion of the periodic discovery interval.

According to a third aspect of the invention, a computer-readable medium programmed with instructions for executing a method to operate a wireless device in an ad hoc network is provided. The method comprises: transmitting and receiving discovery information by the wireless device during a discovery window of a periodic discovery interval; and operating the wireless device in a power save mode during an inactive portion of the periodic discovery interval.

DETAILED DESCRIPTION

Embodiments of the invention provide a mechanism for a wireless device, such as a portable media player device, to bootstrap and synchronize with a wireless network with low power consumption and a mechanism to discover neighbor wireless devices with low power consumption. Further embodiments of the invention provide a mechanism to establish and terminate ad hoc networks among wireless devices. Additional embodiments provide mechanisms to transfer data in a high speed mode and in a power save mode and provide for including information in probe packets for device discovery and for establishing an ad hoc network. Further embodiments provide an operational sequence for an application to discover neighbor wireless devices, to establish connections and to transfer data.

These mechanisms involve software in the wireless devices. The mechanisms can also be implemented in hardware and/or firmware of a wireless device. This allows wireless devices having these mechanisms to communicate and to form ad hoc networks. The communication between wireless devices has no effect on other wireless devices that do not support these mechanisms.

Figure 1:
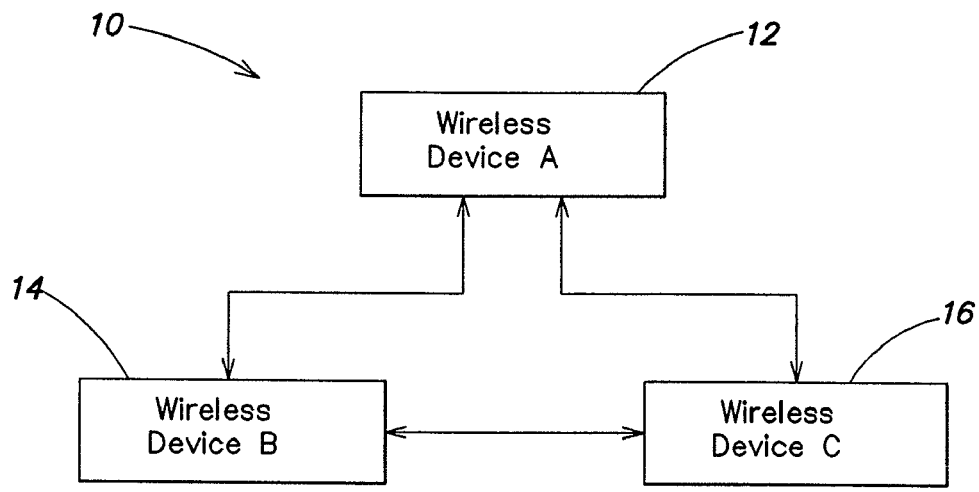
FIG. 1 is a simplified block diagram of an ad hoc wireless network.

An example of a wireless ad hoc network 10 is shown in FIG. 1. Wireless devices 12, 14 and 16 communicate with each other via wireless links. The wireless devices communicate using the mechanisms described below. It is assumed that each wireless device is within radio range of at least one other wireless device in the ad hoc network. It will be understood that all wireless devices in the ad hoc network do not need to be within radio range. For example, wireless devices 14 and 16 may be able to communicate with wireless device 12 but may not be able to communicate directly with each other. By way of example only, wireless devices 12, 14 and 16 may be laptop computers, mobile phones, mobile data devices, portable media player devices, home stereos, wireless speakers or combinations of such devices which utilize a compatible protocol as described below.

Figure 2:
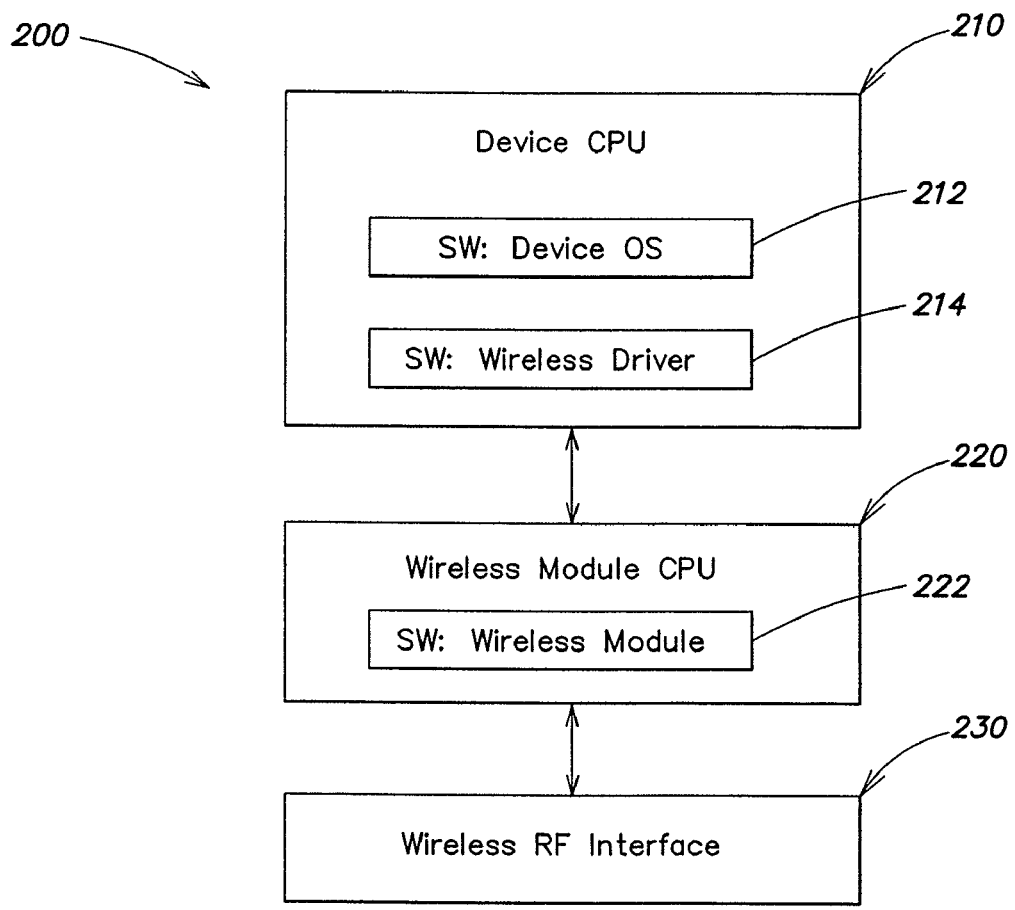
FIG. 2 is a simplified block diagram of a portable media player device suitable for forming an ad hoc wireless network.

A simplified block diagram of a wireless device 200 including components involved in communication in an ad hoc network is shown in FIG. 2. Wireless device 200 may correspond to wireless devices 12, 14 and 16 shown in FIG. 1. An upper layer device CPU 210 interfaces with peripheral components present in the wireless device, such as a display, a keypad or a keyboard, a pointing device, a storage unit such as a disk unit or a flash memory and any other peripheral components of the device. Device CPU 210 includes a device operating system 212 and a wireless driver 214. The wireless driver 214 communicates with a second layer wireless module CPU 220 containing wireless module software 222. The wireless module software 222 interfaces with a lower layer wireless RF interface 230 which communicates with a radio that transmits and receives RF signals via an antenna.

The wireless device 200 may represent a variety of different devices that may be hand-held and mobile or stationary. Examples of wireless devices include, but are not limited to, laptop computers, desktop computers, mobile data devices, mobile phones, stereo systems, and wireless speakers.

In one embodiment, the wireless device 200 is a portable media player device that is provided with wireless capability. The portable media player device may be an MP3 type handheld device that includes a media storage and playback device, such as a disk drive or a flash memory, a user interface such as a display and a keyset or soft keys, an earphone, an interface to a host computer, and a CPU for controlling operation of the device. The portable media player device is provided with wireless driver 214, wireless module CPU 220, wireless module software 222 and wireless RF interface 230 as shown in FIG. 2 in order to implement wireless capability.

Figure 2A:
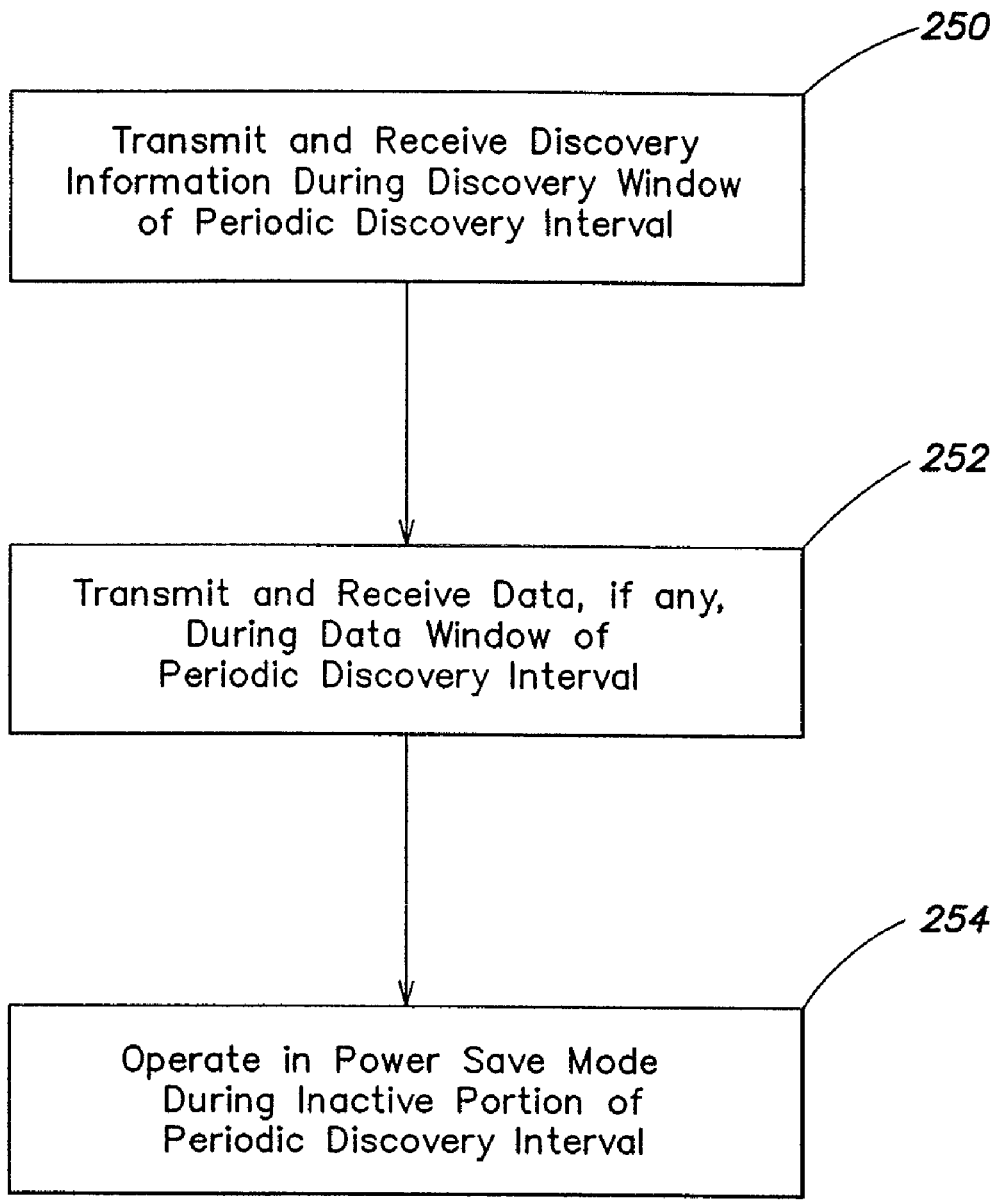
FIG. 2A is a flow chart that illustrates an overview of operation of the portable media player device.

An overview of portable media player device operation is shown in FIG. 2A. In step 250, the portable media player device transmits and receives discovery information during a discovery window of a periodic discovery interval. In step 252, the portable media player device transmits and receives data, if any, during a data window of the periodic discovery interval. The portable media player device operates in a power save mode during an inactive portion of the periodic discovery interval, step 254. These operations are described in detail below.

The operations of each wireless device in discovering other wireless devices, in forming connections or associations with other wireless devices and in transferring data between wireless devices are described below. The operations are described in connection with portable media player devices. However, it will be understood that other wireless devices utilizing compatible protocols may participate in the ad hoc network. Operation is described in connection with the IEEE 802.11 standard. However, the present invention is not limited to the 802.11 standard and can be utilized in connection with other wireless technologies, such as Ultra Wide Band and WiNet. It will be understood that the operations described below are embodiments only and are not limiting as to the scope of the invention.

Wireless Operation Turned On and Off

The portable media player device provides an option for a user to enable/disable wireless functionality. If this option is disabled, then the wireless adapter remains turned off all the time. When this option is enabled, the portable media player device operates as follows.

Wireless Operation Turned On and Bootstrap

Figure 3:
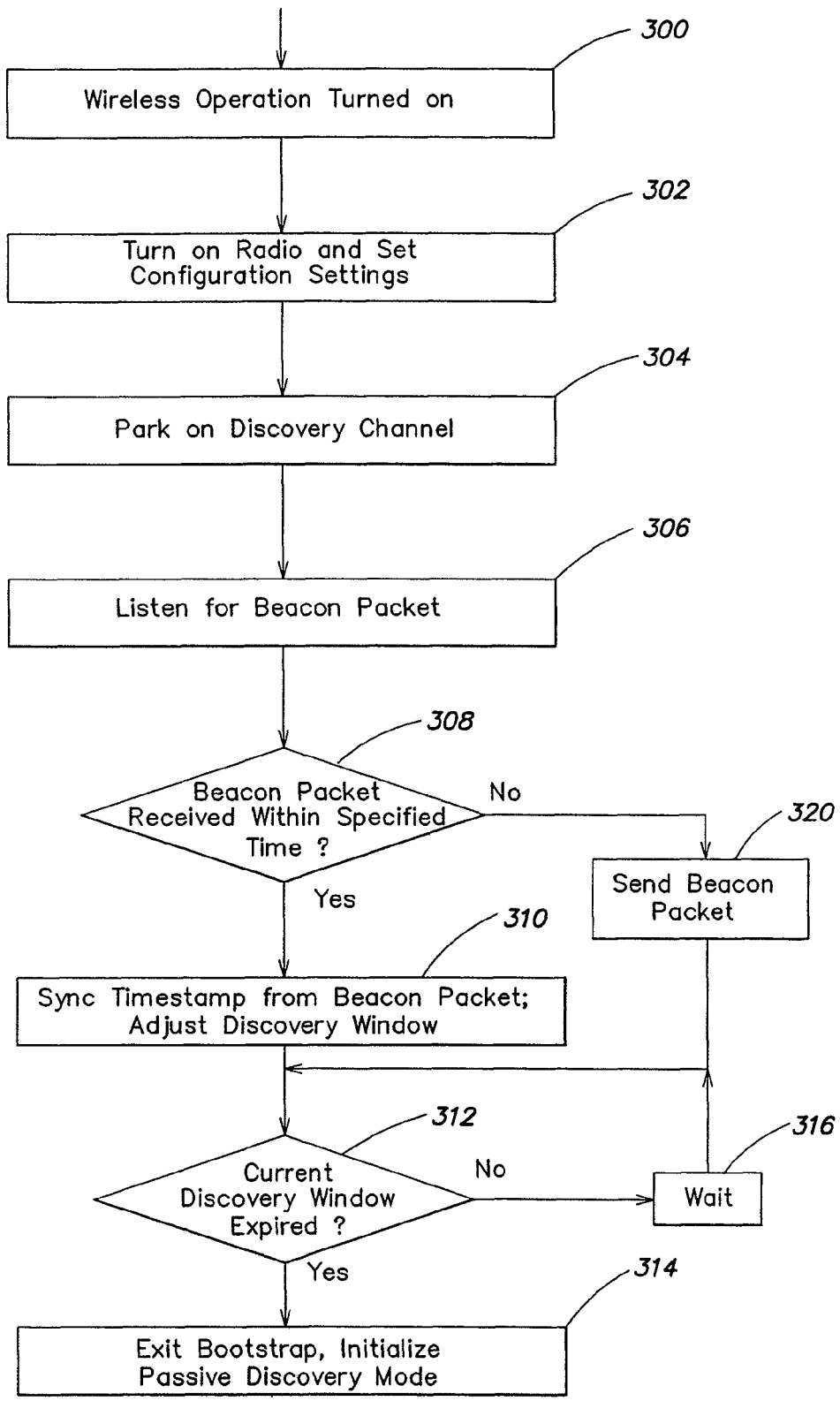
FIG. 3 is a flow chart that illustrates bootstrap operation in the ad hoc network.

A bootstrap operation is illustrated in the flow chart of FIG. 3. When the portable media player device has its wireless operation turned on, step 300, the device does the following:
1) Turn on the wireless adapter radio, and
2) Set the following configuration settings, step 302:
Channel number to establish its own ad hoc network,
BSSID for its own ad hoc network,
Maximum number of joiners allowed in the ad hoc network (default=1), and
Local portable media player information element (IE) information.

When the wireless operation is turned on, the wireless module updates its internal context for portable media player discovery packets. Also, it configures the limit for the maximum number of joiners allowed. At this time, the portable media player device has already had its own ad hoc network established virtually.

The portable media player device turns on its wireless radio and follows the bootstrap operations described below.
1) Park on the discovery channel and stay awake, step 304.
2) Listen for a portable media player beacon packet, step 306. A portable media player beacon packet may be an 802.11 beacon packet with special information as follows:
Receiver address: broadcast address (FF-FF-FF-FF-FF-FF)
SSID: (does not contain SSID IE)
BSSID: unicast address of the portable media player device sending the beacon packet
BSS type: ad hoc
Portable media player IE:
Operation type—beacon
Channel—data channel for its own ad hoc network
Local portable media player information of the beacon sender.
3) If a portable media player beacon packet is received, step 308, then the device does the following:
a) Use the beacon packet to sync its internal timestamp, step 310.

b) Adjust the discovery window to be the same as the sender of the portable media player beacon packets, step 310.

c) Wait until the current discovery window expires, step 312, and then exit bootstrap, step 314.

4) Otherwise, the device does not receive a portable media player beacon packet within certain amount of time (configurable parameter and default to be 3 Discovery Intervals (6000 ms) defined below). In this case, the device does the following:

a) Send out a portable media player beacon packet, step 320.

b) Wait until the current discovery window expires, steps 312, 316, and then exit the bootstrap operation, step 314.

Then the portable media player device initializes its discovery mode to be in passive discovery mode, step 314, as described below. At this time, the wireless module sets the media state to be media disconnected (port down).

Finally, the device sets the passive discovery mode as described below.

Figure 4:
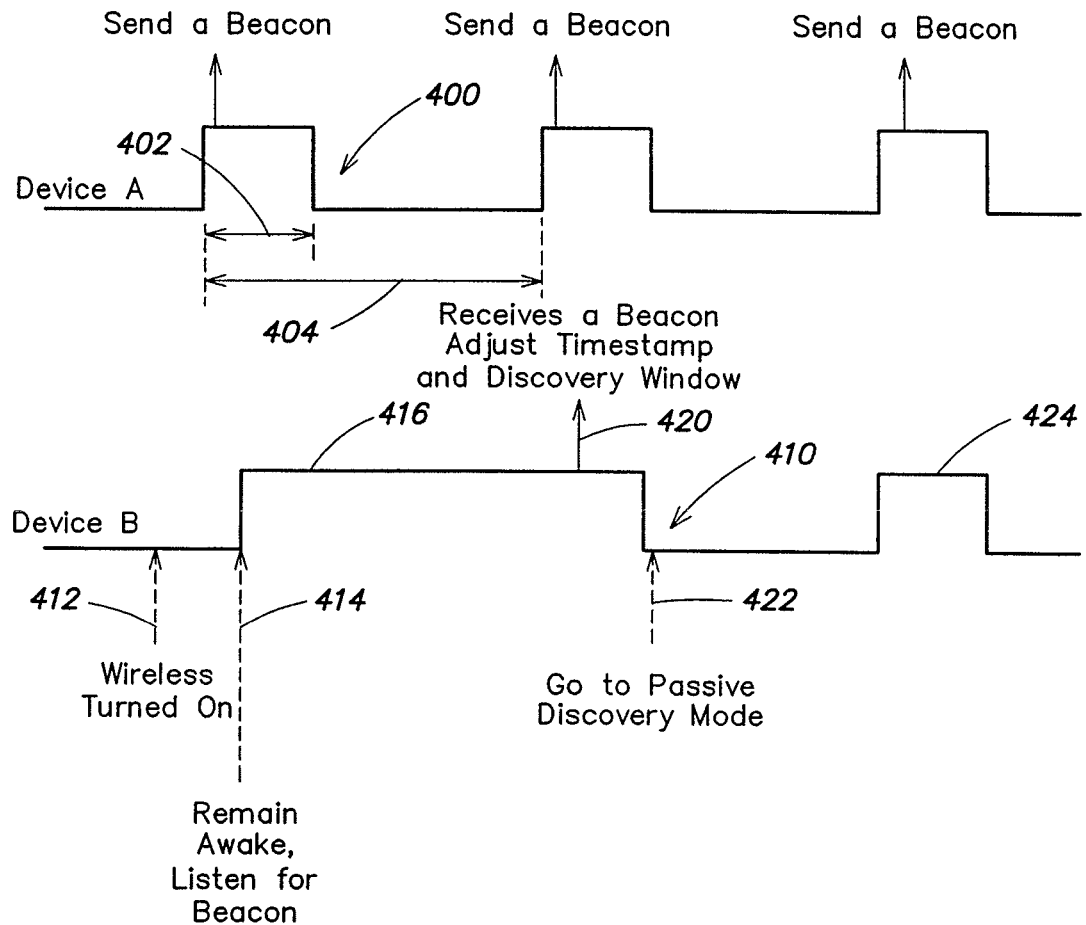
FIG. 4 is a timing diagram that illustrates an example of the bootstrap operation.

A timing diagram that illustrates bootstrap operation of portable media player devices is shown in FIG. 4. A waveform 400 represents a device A, such as wireless device 12 shown in FIG. 1, in a passive discovery mode and sending beacon packets. A waveform 410 represents a device B, such as wireless device 14 in FIG. 1, in a bootstrap mode. Device A turns on during a discovery window 402 which is repeated each discovery period 404. Between discovery windows, device A is in a power save mode. During each discovery window, device A sends a beacon packet and listens for probe requests and responses. In the example of FIG. 4, the discovery window 402 is 100 msec and the discovery period 404 is 2000 msec.

Device B has its wireless operation turned on at time 412 and listens for a beacon packet during a period beginning at time 414. The listening period 416 is at least as great as the discovery period and preferably is about three times the discovery period. At time 420, device B receives a beacon packet and adjusts its internal timestamp and discovery window to synchronize with device A. Then, device B switches to the passive discovery mode at time 422. Subsequently, device B listens for probe requests during discovery windows 424 which are synchronized to the discovery windows of device A.

Wireless Operation Turned Off

When the portable media player device has its wireless operation turned off, the device does the following:

1) Terminate the ad hoc network if it created the network,
2) Clean up context information in the wireless service and driver, and
3) Turn off the wireless adapter radio.

Portable Media Player Device Discovery

Discovery Modes

When a portable media player device has its wireless operation turned on, it can be set in one of two discovery modes: passive discovery mode or active discovery mode.

Passive Discovery Mode

A portable media player device is set to be in passive discovery mode if the user expects neighbor portable media player devices to be in proximity and wants to be discovered by other portable media player devices and to discover neighbor portable media player devices passively. In this mode, the portable media player device is able to detect neighbor devices which are actively discovering, and also to announce it existence to those devices.

Active Discovery Mode

A portable media player device is set to be in the active discovery mode on user demand. This is the case when a user clicks a button to display neighbor devices. If the user expects neighbor portable media player devices to be in proximity and wants to discover those devices, he/she can set the portable media player device to be in the active discovery mode. In this mode, the portable media player device actively detects neighbor portable media player devices in the active or passive discovery mode, and also announces its existence to those devices.

| Discovery Parameters | |
|---|---|
| Discovery Channel: | An 802.11 channel that may be used by all portable media player devices to discover neighbor devices. The channel number must comply with regulatory domain requirements specified in the IEEE 802.11d standard.<br>Default value: channel 11 (for 802.11 b/g in US) |
| Discovery Lifetime: | A period of time that a portable media player device performs discovery operations.<br>Default value: 0 (no timeout for passive discovery) |
| Discovery Interval: | A period of time that a portable media player device periodically resumes from the power save mode and discovers neighbor portable media player devices in the passive discovery mode. This time period includes the portable media player discovery window.<br>Default value: 2000 ms. |
| Discovery Window: | A period of time that a portable media player device remains with power on and performs passive discovery.<br>Default value: 100 ms. |

All devices may have the same values pre-configured for the above parameters.

Passive Discovery Mode Operational Sequences

Figure 5A:
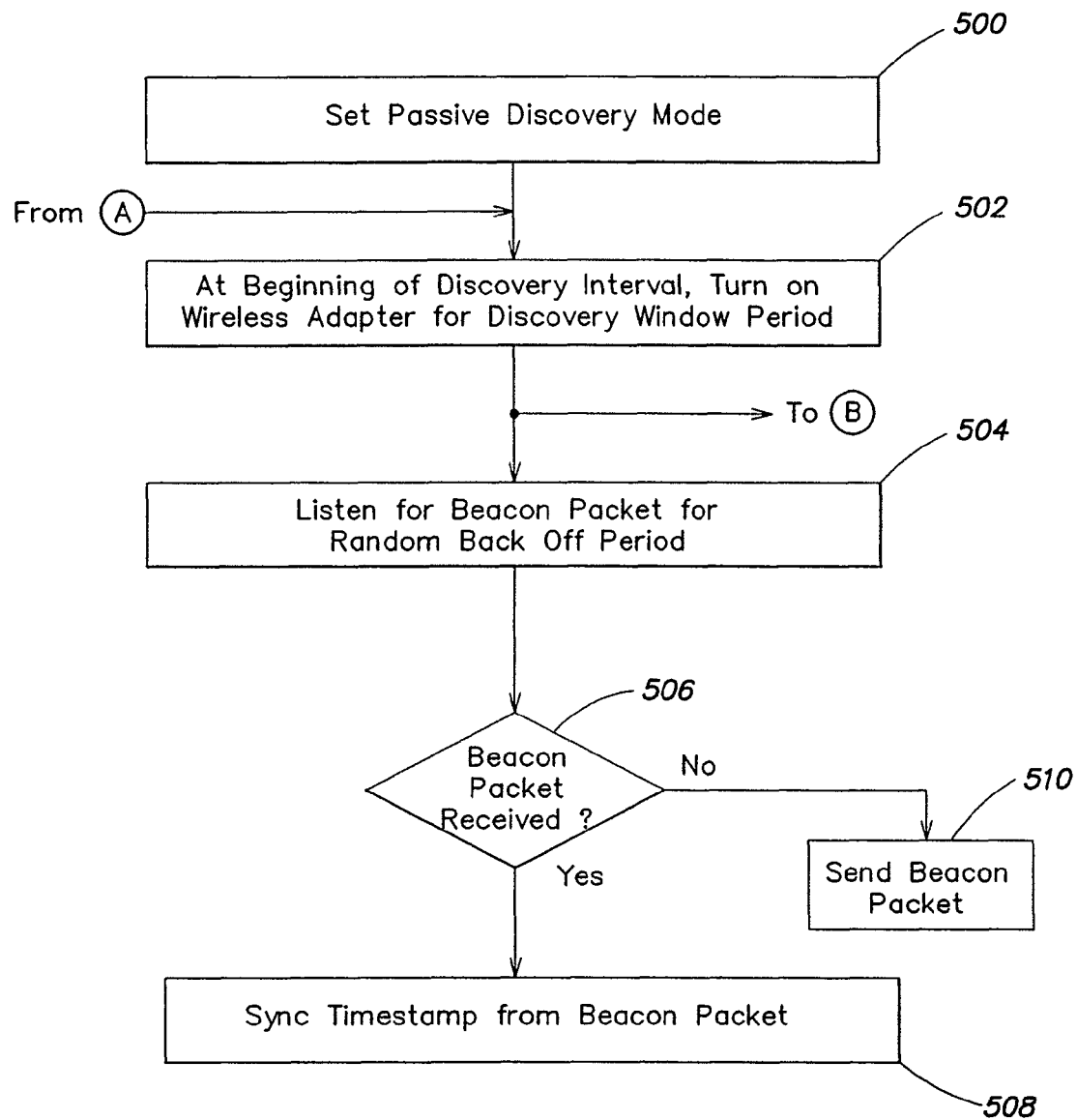
FIG. 5 is a flow chart that illustrates passive discovery in the ad hoc network.
Figure 5B:
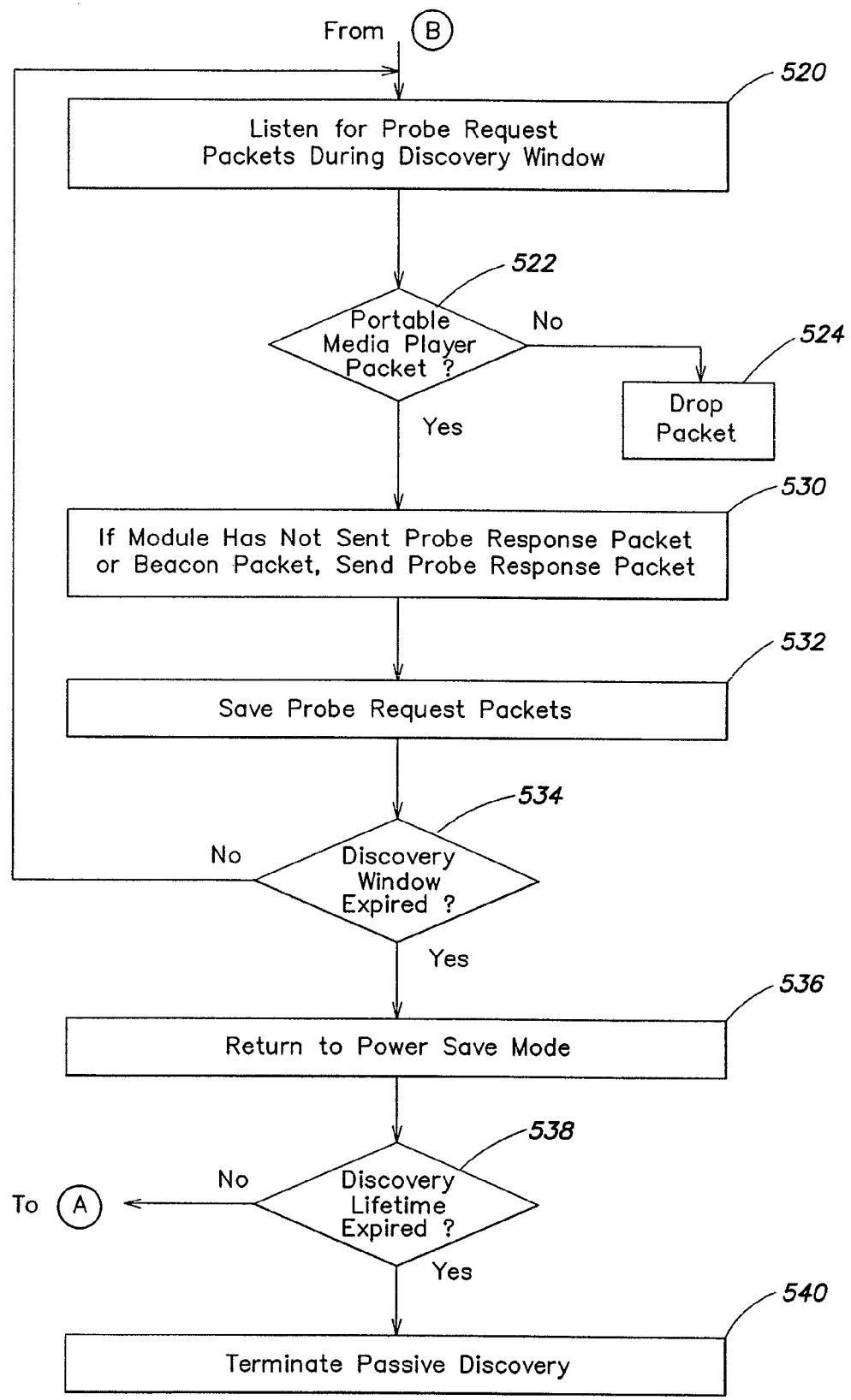

A flow chart of the passive discovery operation is shown in FIG. 5.

1) A portable media player device switches to the passive discovery mode on demand. The device does the following:

Set to be in passive discovery mode, step 500.

This request may have the following parameters:
Discovery Interval
Discovery Window
Discovery Lifetime At the end of a discovery interval, a portable media player device terminates passive discovery, step 540, if the Discovery Lifetime has expired, step 538.

2) At the beginning of each Discovery Interval, the portable media player device wakes up from the power save mode and turns on its wireless adapter for a period of time equal to Discovery Window, step 502. During this window, the portable media player device parks its wireless adapter at the Discovery Channel.

3) The wireless module waits a random back off time (to be fine tuned for specific wireless devices) and listens for a portable media player beacon packet, step 504.

If a portable media player beacon packet is received, step 506, then the wireless module uses this packet to adjust its internal timestamp, step 508.

Otherwise, a portable media player beacon packet is not received in the back-off time. In this case, the wireless module sends out a portable media player beacon packet, step 510.

4) During the Discovery Window, the wireless module also listens for portable media player probe request packets, step 520.

The portable media player device may verify the received packet to be a portable media player probe request packet by matching the following information:
  SSID: (does not contain SSID IE)
  BSSID: broadcast address (FF-FF-FF-FF-FF-FF)
  BSS type: ad hoc
  Portable media player IE:
    Operation type—discovery If the packet is not a portable media player probe request packet, step 522, then the probe request packet is dropped, step 524.

Otherwise, the packet is a portable media player probe request packet.

If the wireless module has not sent any portable media player probe response packet or portable media player beacon packet in the current discovery window, then a portable media player probe response packet is sent, step 530.

The portable media player probe response packet may be an 802.11 probe response packet with special information as follows:
  Receiver address: broadcast address (FF-FF-FF-FF-FF-FF)
  SSID: (does not contain SSID IE)
  BSSID: unicast address of the portable media player device sending the probe response packet
  BSS type: ad hoc
  Portable media player IE:
    Operation type—discovery response,
    Channel—data channel for its own ad hoc network, and
    Its own local portable media player information.

Otherwise, the wireless module has already sent a portable media player beacon packet or responded with a portable media player probe response packet. The wireless module does not send out any more broadcast probe response packets.

In addition, the wireless module accumulates all received portable media player beacon, probe request and probe response packets from unique portable media player devices, step 532, and saves them in its neighbor portable media player device information list. It can return this list to the wireless service, which in turn reports to the application upon query.

5) When the Discovery Window expires, step 534, the portable media player device may return to power saving mode, step 536, until next beacon discovery interval.

6) Steps 2) to 5) (steps 502-536) are repeated if the Discovery Lifetime is 0 or not expired, step 538.

Active Discovery Mode Operational Sequences

Figure 6:
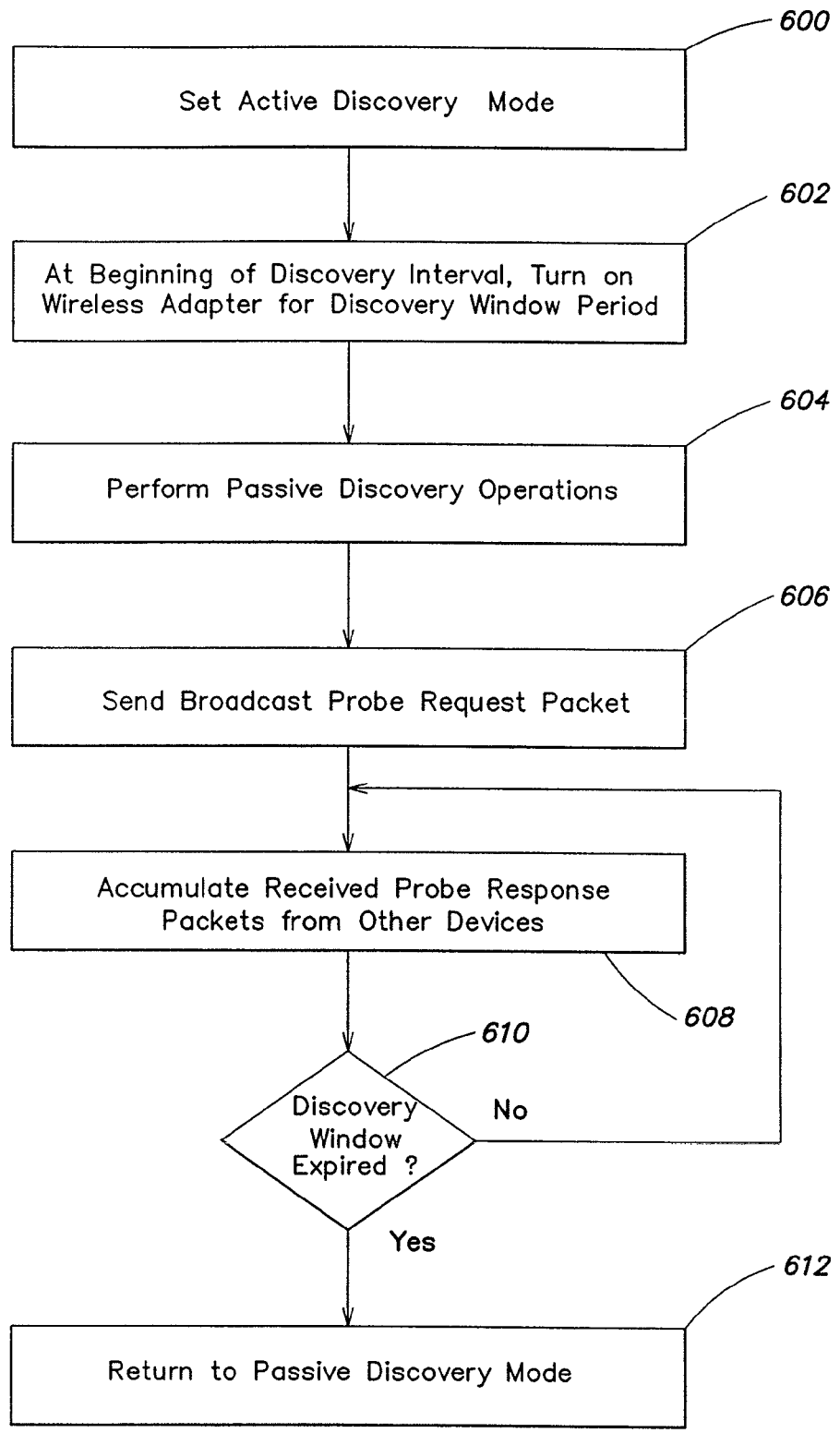
FIG. 6 is a flow chart that illustrates active discovery in the ad hoc network.

A flow chart of the active discovery operation is shown in FIG. 6.

1) The portable media player device changes to the active discovery mode on demand. The caller does the following:
  Issue an active discovery request, step 600.

2) The wireless module waits until the next discovery window. Then the portable media player device wakes up from the power save mode and turns on its wireless adapter for a period of time equal to the Discovery Window, step 602.

3) In the discovery window, the wireless module performs the operations described above for the passive discovery mode, step 604, including
  a. Listen for and send out beacon packet,
  b. Collect portable media player probe packets and accumulate neighbor device information, and
  c. Respond with a portable media player probe response packet when needed.

4) In addition, the wireless module sends out a portable media player probe request packet, step 606.

The portable media player discovery packet may be an 802.11 broadcast probe request packet with special information as follows:
  Receiver address: broadcast address (FF-FF-FF-FF-FF-FF)
  SSID: (does not contain SSID IE)
  BSSID: broadcast address (FF-FF-FF-FF-FF-FF)
  BSS type: ad hoc
  Portable media player IE:
    Operation type—discovery
    Other local portable media player information The wireless module accumulates all received portable media player discovery packets, including beacon, probe request and probe response packets, from unique portable media player devices, step 608, and saves them in its neighbor portable media player device information list. It can return this list to the wireless service, which in turn reports to the application upon query.

5) When the current discovery window expires, step 610, the device may return to the passive discovery mode, step 612.

The wireless module may have an aging function to expire stale portable media player device information entries from its neighbor portable media player device list.

Figure 7:
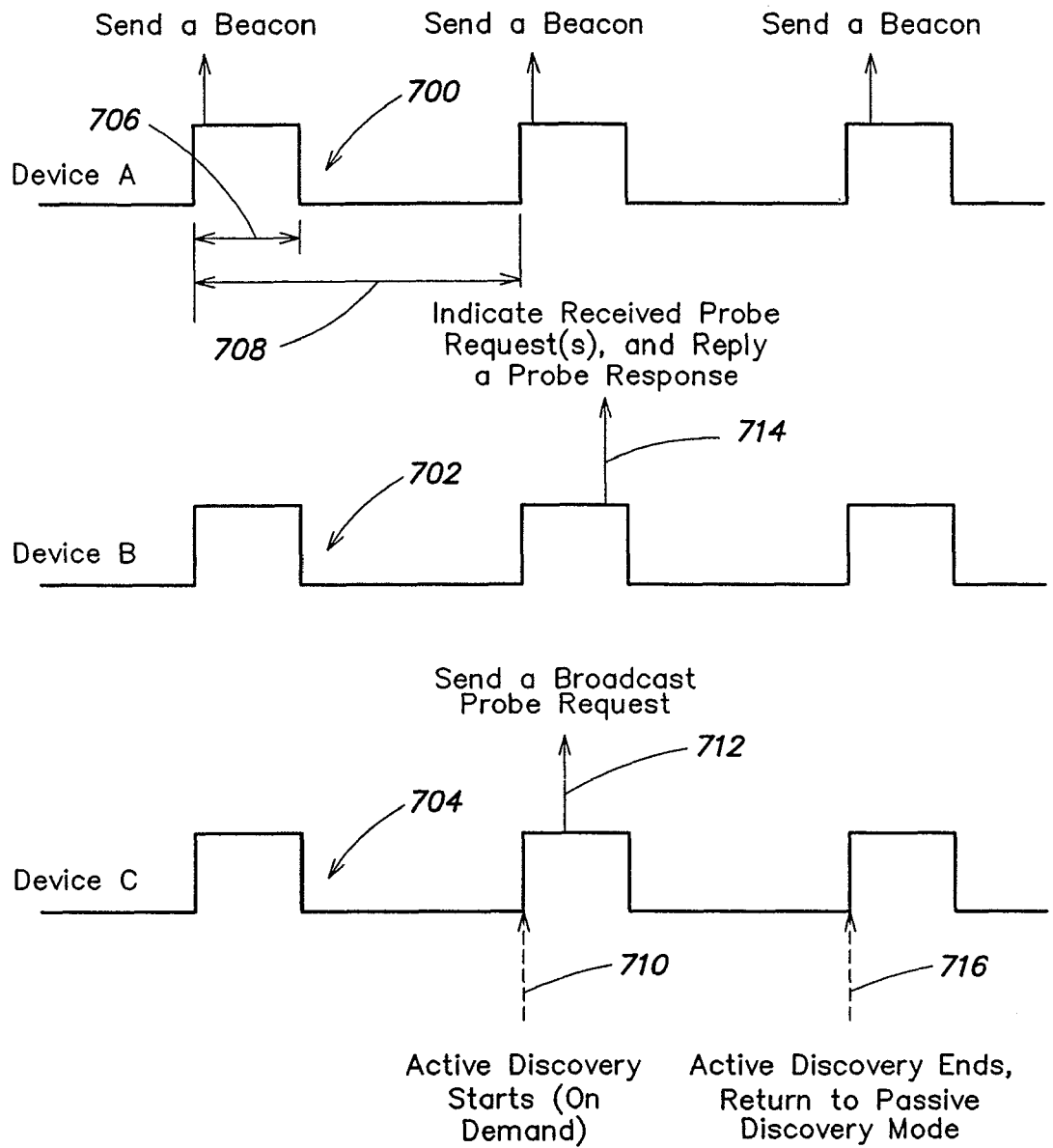
FIG. 7 is a timing diagram that illustrates examples of passive discovery and active discovery operations.

A timing diagram showing portable media player devices performing passive discovery and active discovery is shown in FIG. 7. A waveform 700 represents a portable media player device A, such as device 12 shown in FIG. 1, in the passive discovery mode and sending beacon packets. A waveform 702 represents a portable media player device B, such as wireless device 14 shown in FIG. 1, in the passive discovery mode and not sending beacon packets. A waveform 704 represents a portable media player device C, such as wireless device 16 shown in FIG. 1, in active discovery mode. Device A sends a beacon packet during each discovery window 706 of discovery period 708 and listens for probe responses during the discovery windows. Device B listens for probe requests during each discovery window.

Device C switches to the active discovery mode at time 710 and sends a broadcast probe request at time 712. Device B sends a probe response at time 714 in response to the probe request sent by device C. Device A does not respond to the broadcast probe request from device C, because it is sending beacon packets which are received by device C. At the end of the discovery period at time 716, active discovery ends and device C returns to the passive discovery mode. As shown in FIG. 7, each of devices A, B and C listens for probe requests during synchronized discovery windows and is in power save mode for the remainder of the discovery period. In the example of FIG. 7, the discovery window 706 is 100 msec and the discovery period 708 is 2000 msec.

Portable Media Player IE (Information Element)

The portable media player device may embed portable media player specific information into the Proximity Service Discovery (PSD) information element.

| IE ID (1 byte) | Length (1 byte) | OUI (3 byte) | OUI Type (1 byte) | Format (4 bytes) | portable media player data (0 ... 245 bytes) |
|---|---|---|---|---|---|
| 221 | 8 ... 253 | 00-50-F2 | 6 | Hash (portable media player URL) | portable media player specific data |

Figure 8:
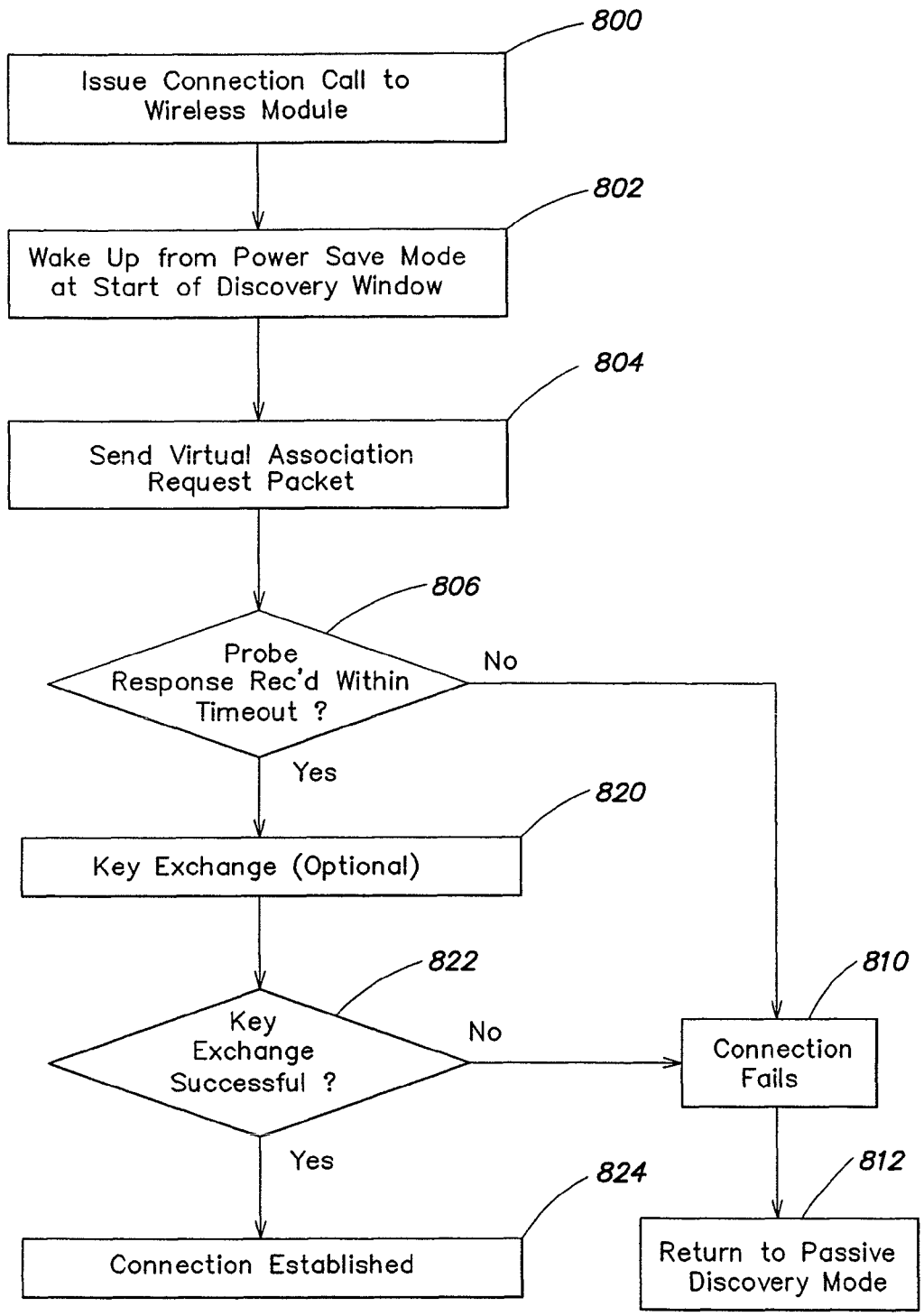
FIG. 8 is a flow chart of operations performed by a joiner to establish a connection to an ad hoc network.

The format field is a hash value of a portable media player URL string to uniquely identify a portable media player IE. The portable media player data may contain the following information:

Unique portable media player device ID—manufacturer hard coded,
portable media player device user friendly name—user defined
Operation type
Beacon
Discovery request
Discovery response
Virtual association request
Virtual association response
Data window announcement
Heartbeat Establish Connection in an Ad Hoc Network
Ad Hoc Network Joiner A flow chart of the operations performed by a network joiner to establish a connection to an ad hoc network is shown in FIG. 8.

If a portable media player device (device B) wants to join an ad hoc network formed by a neighbor portable media player device (device A) which has been discovered by following the above operational sequence, the portable media player device B may do the following:

1) Set the following settings
Desired BSSID (of the target portable media player device to join)
Local portable media player IE information
2) The wireless service issues a connection call to the wireless module, step 800.
Connect (to join an ad hoc network with the BSSID and MAC address as configured above)
3) Upon receiving a connect call from the upper layer, the wireless module may do the following:

The wireless module in device B wakes up from the power save mode at the start of target device A's next discovery window, step 802, based on the discovery result of device A. At this time, the wireless adapter is operating on the discovery channel.

Send out a portable media player virtual association request packet, step 804. The portable media player virtual association request packet may be an 802.11 probe request packet with special information as follows:
Receiver's address: unicast address of the portable media player device to join (device A)
SSID: (does not contain SSID IE)
BSSID: unicast address of the portable media player device to join
BSS type: ad hoc
Portable media player IE:
    Operation type—virtual association request,
    Local portable media player IE information, and
    Supported data rates.

In the meantime, the wireless module stays awake from the power save mode in its own discovery window and performs passive discovery operations as described above.

4) After sending a portable media player probe request packet, the wireless module stays awake for receiving a probe response until it decides to time out or the discovery window expires.

5) If the connection is not successful or if the wireless service does not receive a media connected (port up) event within its connection timeout interval, step 806, and the media state of wireless module is still disconnected (port down), then the wireless module may clean up the internal association context to the target device A, return a connection failure, step 810, to the application and restore its previous state, i.e. park on the discovery channel and return to the passive discovery mode, step 812.

Otherwise, the corresponding probe response is received, step 806, and the connection is successful. Then the wireless module updates its internal state to be associated to the target portable media player device.

6) (Optional) The wireless module can perform a key exchange process, step 820, (e.g., WPA2-PSK) to exchange keys with the other portable media player device.

If the key exchange fails, step 822, it returns a connection failure to the application, step 810, and restores its previous state, i.e. park on the discovery channel and return to the passive discovery mode, step 812.

7) If the association succeeds and the optional key exchange succeeds, step 822, within the current discovery window, then the wireless module indicates to the network stack a media connected (port up) event, step 824, for the target device.

Ad Hoc Network Former

Figure 9:
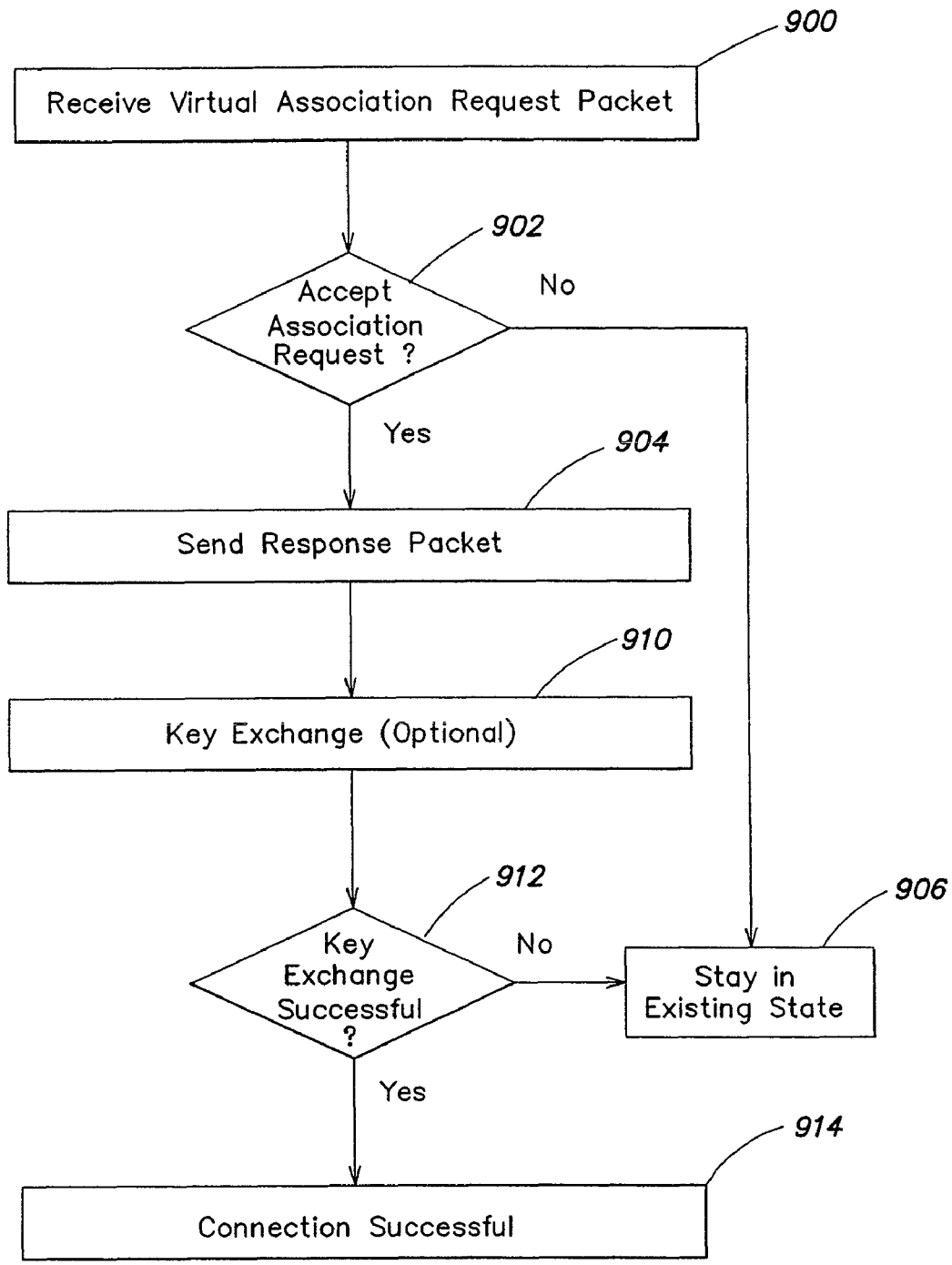
FIG. 9 is a flow chart of operations performed by a former to establish a connection with a joiner.

A flow chart of the operations performed by a network former to establish a connection to a joiner is shown in FIG. 9.

If a portable media player device receives a portable media player virtual association request packet, step 900, it may do the following:

1) The wireless module decides whether to allow the requestor to associate, step 902, and sends out a portable media player virtual association response packet, step 904, as follows:
SSID: (does not contain SSID IE)
BSSID: its own local BSSID
BSS type: ad hoc
Portable media player IE:
    Operation type—virtual association response
    Association status (802.11 status code)
    Supported data rates accepted (when succeeds)

The wireless module rejects the new association request if the maximum number of joiners has been reached.

2) If the association is not accepted, step 902, then the wireless module cleans up its internal association context for the requesting device and remains in its existing state, step 906, i.e. park on the discovery channel and remain in the passive discovery mode.

Otherwise, the association succeeds, step 902. Then the wireless module updates its internal state to be associated to the target portable media player device.

3) (Optional) The wireless module may perform an optional key exchange process, step 910, (e.g., WPA2-PSK) to exchange keys with the peer device.

If the key exchange fails, step 912, the wireless module cleans up the internal association context for the requesting device and remains in its existing state, step 906, i.e. park on the discovery channel and remain in the passive discovery mode.

4) If the association succeeds and the optional key exchange succeeds, step 912, within the current discovery window, then the wireless module indicates to the network stack a media connected (port up) event, step 914, for the joining device.

When both portable media player devices are virtually associated with each other and indicate a media connected state to the network stack, a wireless connection is established. The network stack configures IP settings and starts to transmit/receive IP packets.

The upper layer application executes higher layer protocols (such as file sending or DJ streaming) to transfer data. The higher layer protocol also sends and monitors higher layer heartbeat packets from the peer.

Figure 10:
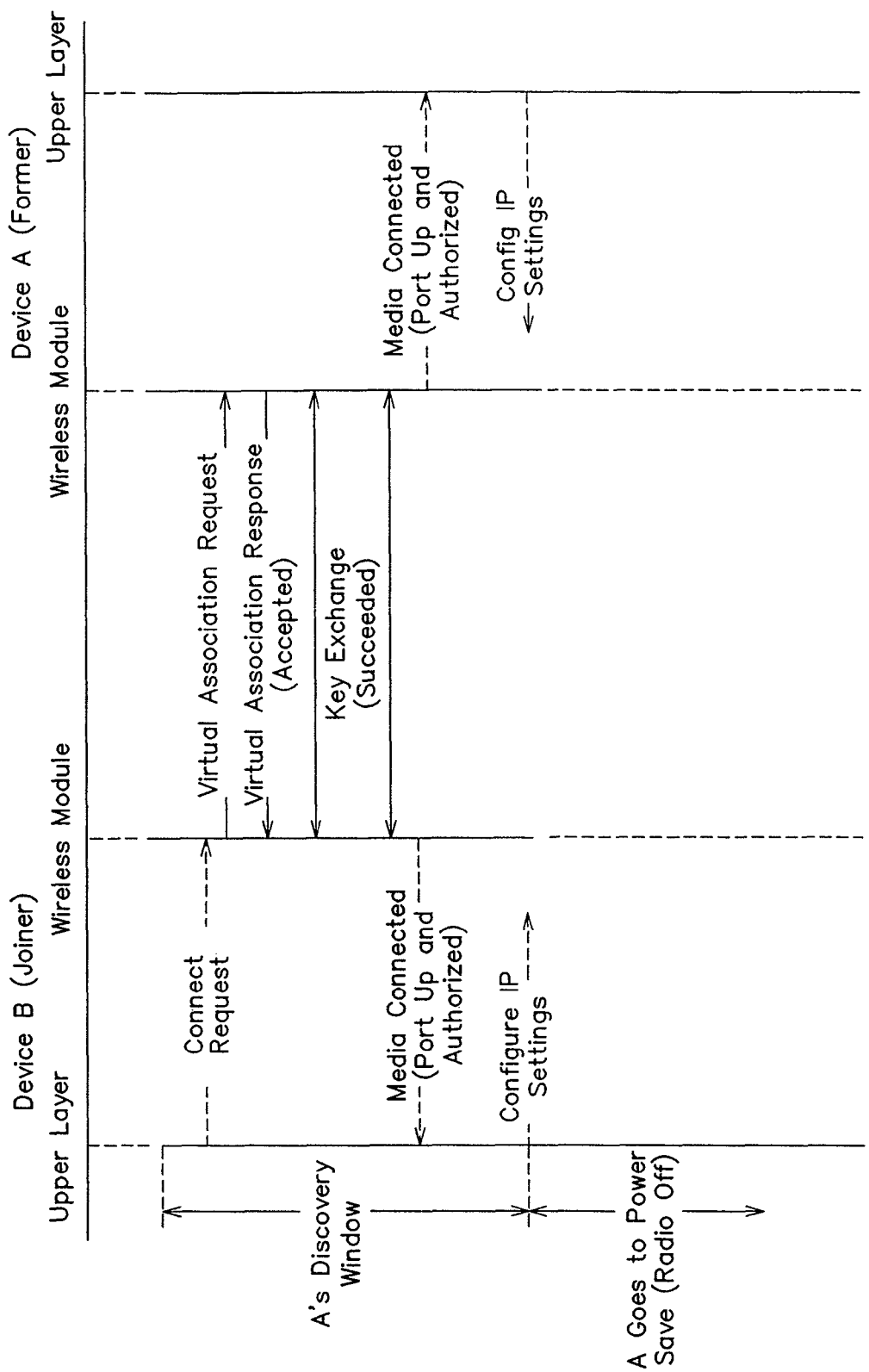
FIG. 10 is a schematic diagram that illustrates operations to form a virtual association between a joiner and a former.

A schematic diagram of operations to form a virtual association between a joiner and a former is shown in FIG. 10. A portable media player device B, such as wireless device 14 shown in FIG. 1, is a network joiner and a portable media player device A, such as wireless device 12 shown in FIG. 1, is a network former. An upper layer of device B sends a connect request to the wireless module of device B during the discovery window. The wireless module sends a virtual association request to device A during the discovery window, and device A sends a virtual association response to device B. An optional key exchange may be utilized. If the virtual association request is accepted, and the key exchange is successful, device B sends a media connected event to its upper layer, and device A sends a media connected event to its upper layer. Then, the IP settings are configured in each device, and the devices are ready for data transfer.

Terminate Ad Hoc Network

Ad Hoc Network Joiner

If the application decides to terminate the ad hoc network, it does the following:

1) The wireless service issues a disconnect call to the wireless module. After receiving a disconnect call from the upper layer, the wireless module leaves the ad hoc network.

2) Indicate a media disconnected (port down) event to the upper layer.

3) Return to the passive discovery mode and restore the initial settings for its own (virtual) ad hoc network.

The ad hoc joiner monitors the packets from the ad hoc former. If a joiner does not receive any packets from the former for a long time and decides to time out the connection, then the joiner does the following:

1) Age out the former by cleaning up all internal connection context.

2) Indicate a media disconnected (port down) event to the upper layer.

3) Return to the passive discovery mode and restore the initial settings for its own (virtual) ad hoc network.

Ad Hoc Network Former

The ad hoc network former monitors the packets from each joiner. If the former does not receive any packet from the joiner for a long time and decides to time out the connection, then the ad hoc network former does the following:

1) Age out the joiner by removing it from its associated joiner list.

2) Indicate a port down event to the upper layer to indicate a joiner is removed.

3) If the joiner is the last one in the network, then
a) Indicate a media disconnected event to upper layer, and
b) Return to the passive discovery mode.

If the application decides to disconnect an association with a joiner in the network, it does the following:

1) The wireless service issues a disconnect call to the wireless module. After receiving a disconnect call from the upper layer, the ad hoc network former removes the joiner from its associated joiner list.

2) Indicate a port down event to the upper layer to indicate a joiner is removed.

3) If the joiner is the last one in the network, then
a) Indicate a media disconnected event to upper layer, and
b) Return to the passive discovery mode.

If the application decides to terminate the current ad hoc network, it does the following:

1) The wireless service issues a disconnect call to the wireless module.

2) After receiving a disconnect call from the upper layer, the wireless module does the following:
a) Remove all joiners from its associated joiner list,
b) Indicate a media disconnected event to the upper layer, and
c) Return to passive discovery mode.

Data Transfer

| Data Transfer Parameters | |
| --- | --- |
| Data Window Size | Setting of data window size |
| Min Data Window Size | The minimum value of a data window Constant: 50 ms |
| Max Data Window Size | The maximum value of a data window. The value should be less than (Discovery Interval − Discovery Window − channel switch time * 2) Constant: 1800 ms |

Data Transfer Modes

When a portable media player device joins an ad hoc network, or an ad hoc former has one or more joiners in its network, the device can have two data transfer modes: high speed data transfer mode and power save data transfer mode.

The portable media player device can operate the wireless module in the high speed data transfer mode if it has a large amount of data and wants to complete the transfer in short time, such as a file sending scenario or a music transfer phase in a DJ scenario. In this mode, the wireless device always powers up and operates in a long data window constantly.

The portable media player device can operate the wireless module in the power save data transfer mode if it only wants to send out sparse data occasionally, such as a music play and control phase in a DJ scenario. In this mode, the wireless module only wakes up and operates in a short data window and then goes to power save.

An upper layer application can set a device to be in one of the two data transfer modes by issuing a set data transfer mode call to the wireless module.

If the wireless module is set in the high speed data transfer mode, then the wireless module does the following:
Set Data Window Size to be Max Data Window Size.
Otherwise, the wireless device is set in the power save data transfer mode, and the wireless module does the following:
Set Data Window Size to be Min Data Window Size.

Operational Sequence for Data Transfer

Figure 11:
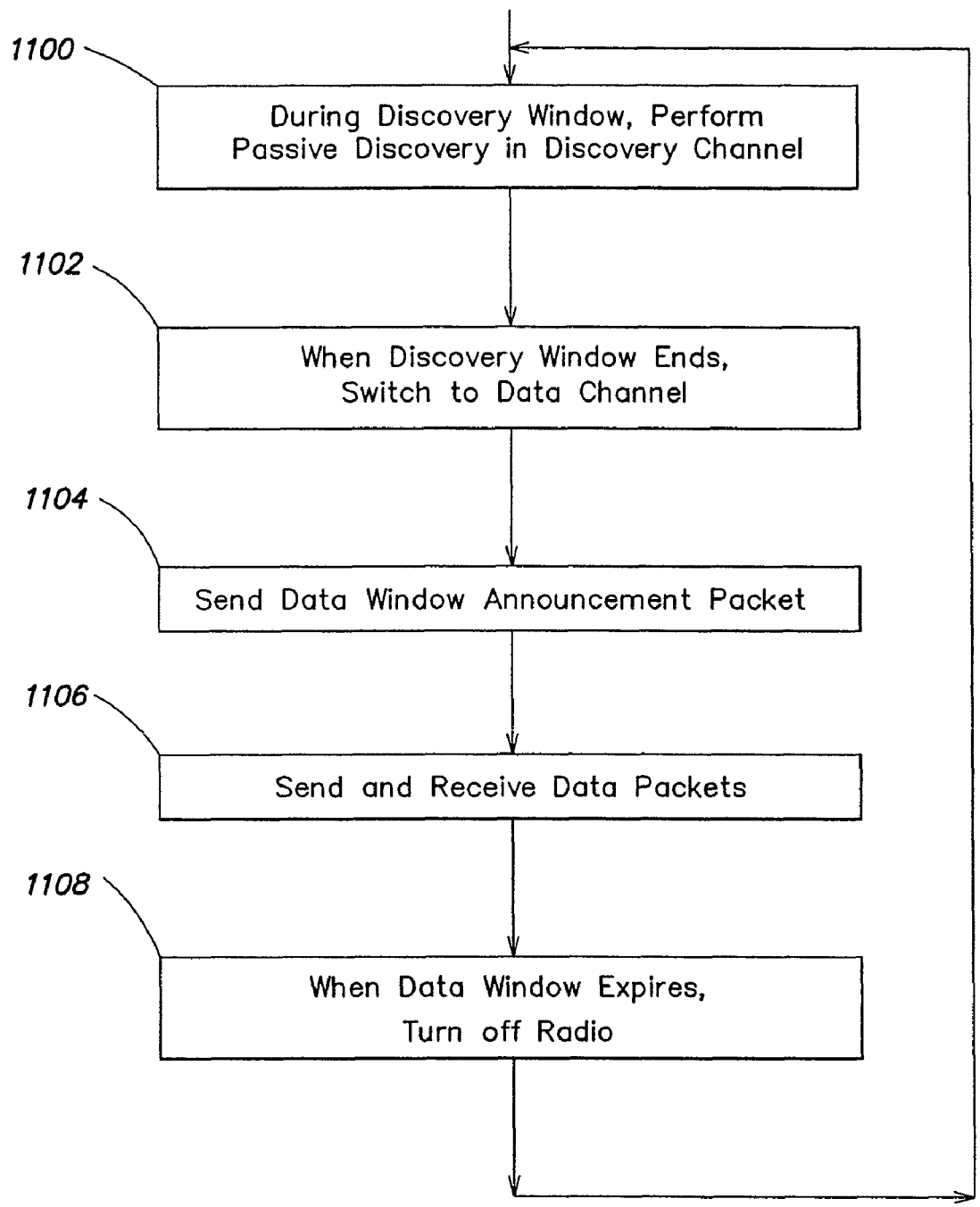
FIG. 11 is a flow chart that illustrates a data transfer operation by the ad hoc network former.

A flow chart of the data transfer operation by the ad hoc network former is shown in FIG. 11.

The portable media player device A forms the ad hoc network and has one or more joiners in its own ad hoc network. At this time wireless module in device A does the following:

1) The wireless module stays awake and parks at its own discovery channel in its discovery window to perform passive discovery, step 1100, as described above.

2) When the discovery window ends, the wireless module starts the data window. It immediately switches to the data channel, step 1102, that has been advertised in its portable media player probe response packet.

3) The wireless module sends out a portable media player data window announcement packet, step 1104, immediately after the channel switch is completed.

The data window announcement packet may be an 802.11 probe response packet containing the following information:

Receiver's address: broadcast address (FF-FF-FF-FF-FF-FF)
SSID: (does not contain SSID IE)
BSSID: its own local BSSID
BSS type: ad hoc
Portable media player IE:
Operation type—data window announcement
Current data transfer mode—(high speed or power save)
Heartbeat request to joiner—(optional) MAC address of a device that is required to send a heartbeat response If the ad hoc network former does not receive any packet from a joiner for a long period of time and is going to age out the joiner due to inactivity, it can use the heartbeat request in the portable media player information element to probe the existence of the joiner. If there are two or more such joiners, the wireless module uses a round robin approach to select the joiners for a heartbeat request.

4) After sending out the data window announcement packet, the wireless module is ready for data packet receiving and sending, step 1106.

5) When the current data window expires, the wireless module stops sending and receiving packets and turns off its wireless radio, step 1108, for power saving. If the data window is sufficiently long, power saving may not be achieved.

6) When the next Discovery Window starts, the wireless module switches to the discovery channel and performs passive discovery, step 1100, as described above. Thus, passive discovery and data transfer are performed concurrently in a time sharing manner.

7) Steps 1) to 6) (steps 1100-1108) are repeated until the ad hoc network does not have any joiner or is terminated.

Figure 12:
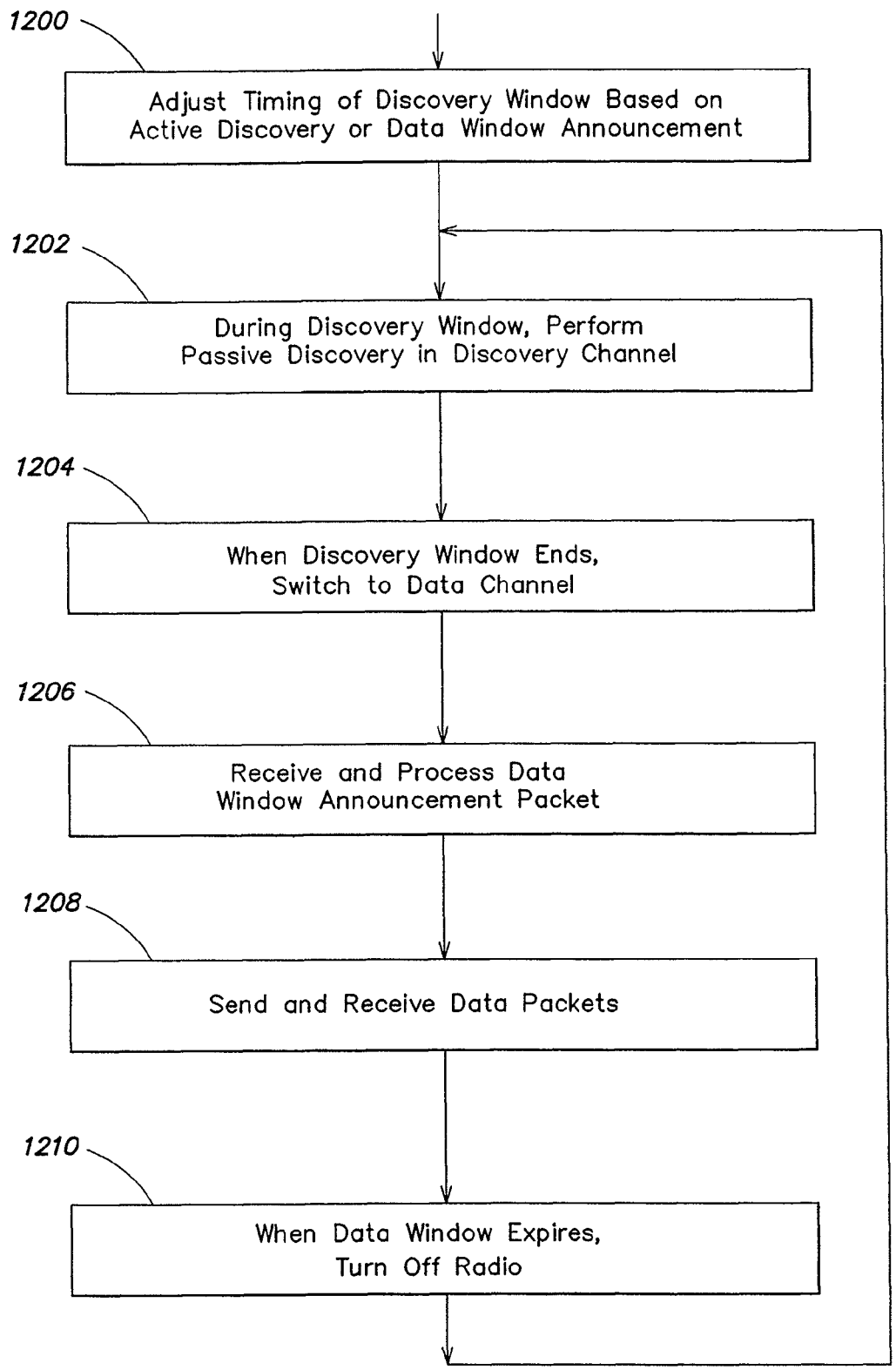
FIG. 12 is a flow chart that illustrates a data transfer operation by the ad hoc network joiner.

A flow chart of the data transfer operation by the ad hoc network joiner is shown in FIG. 12.

The portable media player device B joins the ad hoc network that is formed by device A. After successful joining, the wireless module in device B does the following:

1) The wireless module adjusts the starting time of its discovery window to be the same as device A's (the former of the ad hoc network) based on the active discovery result or the data window announcement, step 1200.

2) In the discovery window, the wireless module stays awake and parks at the discovery channel to perform passive discovery as described above, step 1202.

3) The wireless module switches to the data channel, step 1204, that has been advertised in device A's (former) portable media player probe response packet by the time the data window starts. At this time, the wireless module sets the size of the current data window to Data Window Size, which is configured by the upper layer.

4) If the wireless module does not receive a portable media player data window announcement packet within the minimum data window, then it does the following:
Extend the size of the current data window to be the maximum data window size.

Otherwise, the wireless module receives a portable media player data window announcement packet, step 1206, from the former (device A) and does the following:

i. Use this probe response packet to sync its internal timestamp.

ii. The wireless module checks the current data transfer mode field in the portable media player IE. If the data transfer mode in IE is different from the internal data transfer mode, then the wireless module adjusts the size of the current data window to comply with the former.

iii. The wireless module checks the heartbeat request of the joiner field in portable media player IE. If the address equal to the local MAC address, then the wireless module sends out a heartbeat packet.

A heartbeat packet may be an 802.11 probe response packet containing the following information:
Receiver's address: device A's MAC address
SSID: (does not contain SSID IE)
BSSID: BSSID of the ad hoc network
BSS type: ad hoc
Portable media player IE:
Operation type—Heartbeat 5) The wireless module starts sending and receiving data packets to and from the ad hoc network former, step 1208.

6) When the current data window expires, the wireless module stops sending and receiving data packets and turns off its wireless radio for power saving, step 1210. If the data window is sufficiently long, power saving may not be achieved.

7) When the next Discovery Window starts, the wireless module switches to the discovery channel and performs passive discovery, step 1202, as described above. Thus, passive discovery and data transfer are performed concurrently in a time sharing manner.

8) Steps 2) to 7) (steps 1202-1210) are repeated until the device leaves the ad hoc network.

Figure 13:
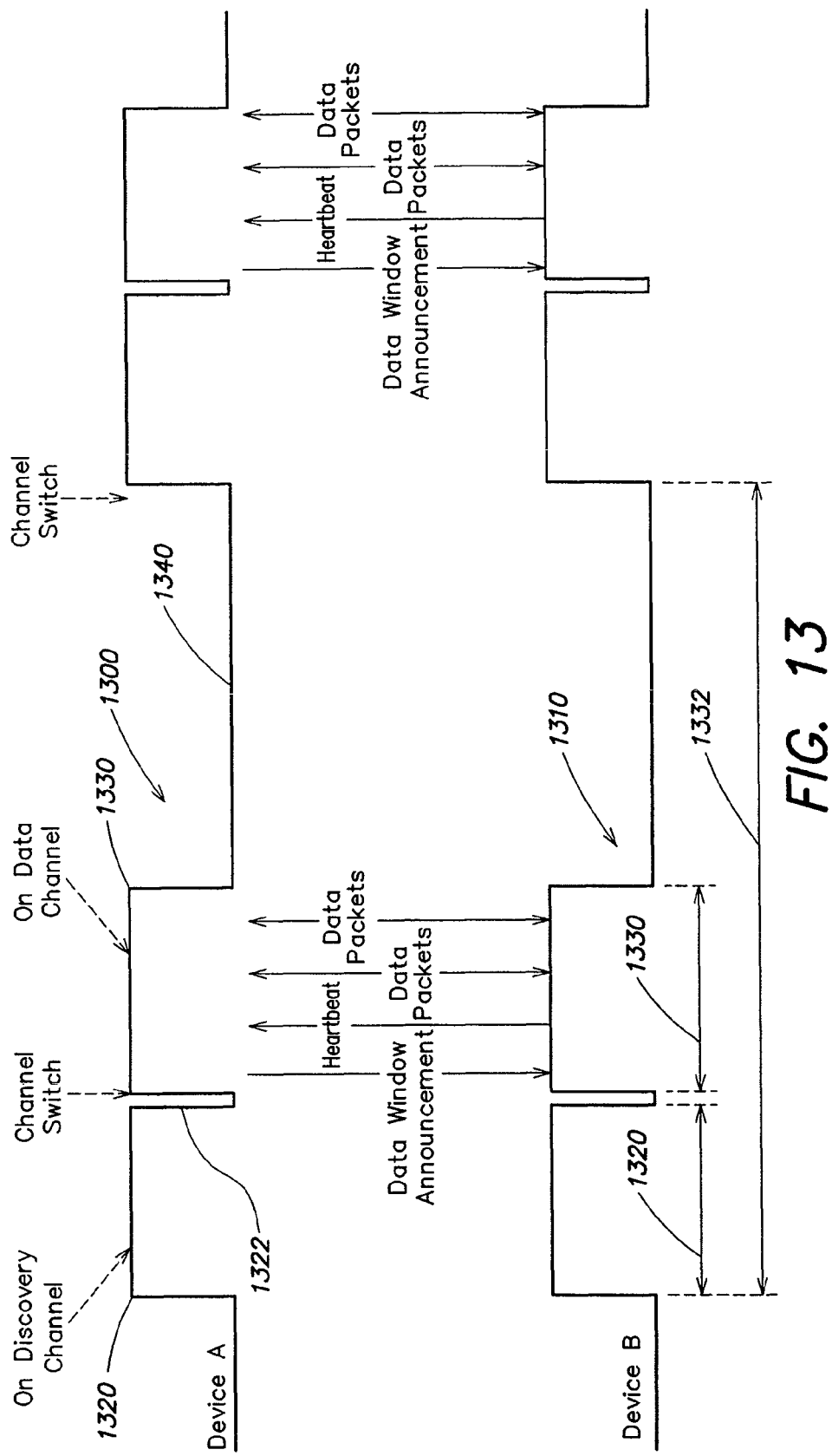
FIG. 13 is a timing diagram that illustrates a power save data transfer operation.

A timing diagram that illustrates a power save data transfer operation is shown in FIG. 13. A waveform 1300 illustrates operations in a portable media player device A, and a waveform 1310 illustrates operations in a portable media player device B. Device A and device B listen for probe request packets on a discovery channel during synchronized discovery windows 1320. At the end of the discovery window 1320 at time 1322, the devices switch from the discovery channel to a data channel and a data window announcement is sent from device A to device B. A heartbeat packet may be sent from device B to device A. Data packets are sent and received during a data window 1330 which may be relatively short in comparison with a discovery period 1332. Devices A and B then switch to power save mode during a time 1340 until the next discovery period begins. In the example of FIG. 13, the discovery window 1320 is 100 msec, the data window 1330 is 100 msec and the discovery period 1332 is 2000 msec.

Figure 14:
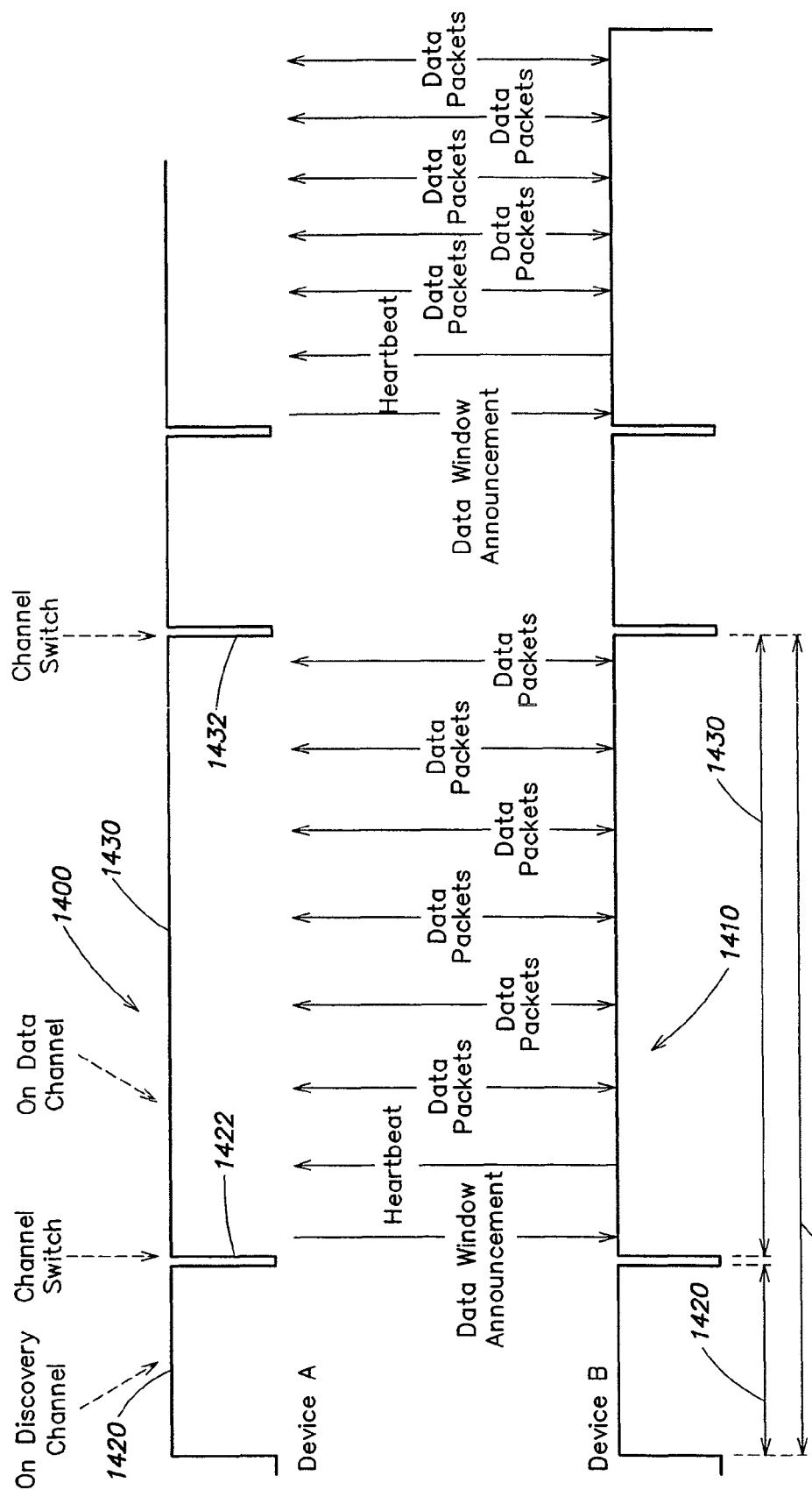
FIG. 14 is a timing diagram that illustrates a high speed data transfer operation.

A timing diagram that illustrates a high speed data transfer operation is shown in FIG. 14. A waveform 1400 represents the operations of a portable media player device A, and a waveform 1410 represents the operations of a portable media player device B. Device A and device B listen for probe request packets on a discovery channel during synchronized discovery windows 1420. The devices switch from the discovery channel to the data channel at a time 1422. Device A sends a data window announcement to device B, and device B may send a heartbeat packet to device A. Data packets are sent and received during a data window 1430. In the high speed data transfer mode, data window 1430 continues during the remainder of a discovery period 1440. At the end of the discovery period at time 1432, devices A and B switch back to the discovery channel and listen for probe requests during the discovery window. In the example of FIG. 14, discovery window 1420 is 100 ms, discovery period 1440 is 2000 ms and data window 1430 is approximately 1900 ms.

DJ Scenario
Start DJ Mode

If a portable media player device is set to start the DJ mode on demand, the device does the following:

1) Set the following configuration settings:
Channel number to establish its own ad hoc network
BSSID for its own ad hoc network
Maximum number of joiners allowed in ad hoc network (default=10)
Local portable media player information element (IE) which contains DJ streaming information.

2) Upon receiving the local portable media player IE for the DJ mode, the wireless device saves its initial state. Then the wireless module updates its internal context to include such information in its portable media player discovery packets. Also, it updates the limit for the maximum number of joiners in its own ad hoc network. At this time, the initial ad hoc network has been re-configured for DJ streaming.

Operate in DJ Mode

The DJ applications and listeners can switch to high speed data transfer mode when they want to exchange music data with joiners and they can switch to power save data transfer mode when only DJ control and management packets are exchanged.

Stop DJ Mode

If a portable media player device is set to end the DJ mode on demand, the device does the following:

1) Restore its internal context to be the initial mode and settings.

Join a DJ Network

If a portable media player device is set to join the DJ network formed by the DJ device, the portable media player device issues a connect call to the wireless module as described above. The DJ application waits for the media connected event to start operation on the wireless connection.

Leave a DJ Network

If a portable media player device is set to leave the DJ network formed by the DJ device, the portable media player device issues a disconnect call to the wireless module as described above. Then it can immediately stop the DJ operation.

File Sending Scenario
Start Sending File

If a portable media player device is set to send a file to another portable media player device, the local device issues a connection call as described above. The file sending application waits for the media connected event to start operation on the wireless connection.

Operate in Sending File

The file transfer applications on both file receiver (ad hoc former) and file sender (joiner) turn on the high speed data transfer mode before the data transfer starts in order to achieve a short file sending time.

Stop Sending File

If a portable media player device is set to stop file sending, the device issues a disconnect call to wireless module as described above. Then it can immediately stop the file sending operation.

The above description and the accompanying drawings provide examples of values for various parameters, such as timing parameters. It will be understood that such values are given by way of example only and are not in any way limiting as to the scope of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method to operate a wireless device, comprising:
performing passive discovery operations on a discovery channel by the wireless device during a discovery window of a periodic discovery interval, the passive discovery operations enabling discovery by neighbor wireless devices and discovering neighbor wireless devices passively;
switching from the discovery channel to a data channel when the discovery window of the periodic discovery interval ends;
sending a data announcement packet on the data channel during a data window of the periodic discovery interval;
sending data on the data channel during the data window of the periodic discovery interval following transmission of the data announcement packet;
operating the wireless device, during the periodic discovery interval, with a short data transfer window followed by a power save mode, in which a radio of the wireless device is turned off, when a power save data transfer mode is selected;
operating the wireless device, during the periodic discovery interval, with a long data window when a high speed data transfer mode is selected; and
alternating between the discovery channel used for the discovery window and the data channel used for the data window, wherein passive discovery and data transfer are performed concurrently, and power is saved when the power save data transfer mode is selected.

2. A method as defined in claim 1, further comprising:
turning on a radio of the wireless device in response to activation of wireless operation;
listening for a beacon packet for a specified time;
if a beacon packet is received in the specified time, adjusting timing of the discovery window in accordance with parameters in the received beacon packet; and
if a beacon packet is not received in the specified time, sending a beacon packet.

3. A method as defined in claim 1, further comprising:
turning on a radio of the wireless device during the discovery window, in response to activation of a passive discovery mode;
listening for a beacon packet for a random back-off time;
if a beacon packet is received within the random back-off time, adjusting timing of the discovery window in accordance with parameters in the received beacon packet;
if a beacon packet is not received within the random back-off time, sending a beacon packet;
listening for a probe request packet during the discovery window;
saving information relating to received probe request packets; and
sending a probe response packet if the wireless device has not sent a probe response packet or a beacon packet in the current discovery window.

4. A method as defined in claim 1, further comprising:
turning on a radio of the wireless device during the discovery window, in response to activation of an active discovery mode;
sending a broadcast request packet during the discovery window; and saving information contained in response packets sent by other wireless devices in response to the broadcast request packet.

5. A method as defined in claim 1, further comprising:
turning on a radio of the wireless device during the discovery window, in response to a connect call;
sending a connection request packet to a second wireless device during the discovery window;
if a connection response packet is received within the discovery window, establishing a connection to the second wireless device; and
if a connection response packet is not received within the discovery window, indicating a connection failure.

6. A method as defined in claim 1, further comprising:
receiving a connection request packet by the wireless device during the discovery window;
if the connection request packet is accepted, sending a connection response packet during the discovery window; and
if the connection request packet is not accepted, dropping the connection request packet and remaining in a current state.

7. A method as defined in claim 1, wherein the data includes music data for a portable media player device.

8. A wireless portable media player device comprising:
a portable media player;
a radio to permit wireless operation; and
a wireless module logically connected to the portable media player and to the radio to operate the wireless portable media player device, the wireless module comprising a processor programmed with instructions for:
performing passive discovery operations on a discovery channel during a discovery window of a periodic discovery interval, the passive discovery operations enabling discovery by neighbor wireless devices and discovering neighbor wireless devices passively;
switching from the discovery channel to a data channel when the discovery window of the periodic discovery interval ends;
sending a data announcement packet on the data channel during a data window of the periodic discovery interval;
sending data on the data channel during the data window of the periodic discovery interval following transmission of the data announcement packet;
operating the wireless portable media player device, during the periodic discovery interval, with a short data transfer window followed by a power save mode, in which the radio is turned off, when a power save data transfer mode is selected;
operating the wireless portable media player device, during the periodic discovery interval, with a long data window when a high speed data transfer mode is selected; and
alternating between the discovery channel used for the discovery window and the data channel used for the data window, wherein passive discovery and data transfer are performed concurrently, and power is saved when the power save data transfer mode is selected.

9. A wireless portable media player device as defined in claim 8, wherein the instructions further include instructions for:
turning on the radio in response to activation of wireless operation;
listening for a beacon packet for a specified time;
if a beacon packet is received in the specified time, adjusting timing of the discovery window in accordance with parameters in the received beacon packet; and
if a beacon packet is not received in the specified time, sending a beacon packet.

10. A wireless portable media player device as defined in claim 8, wherein the instructions further include instructions for:
turning on the radio during the discovery window, in response to activation of a passive discovery mode;
listening for a beacon packet for a random back-off time;
if a beacon packet is received within the random back-off time, adjusting timing of the discovery window in accordance with parameters in the received beacon packet;
if a beacon packet is not received within the random back-off time, sending a beacon packet;
listening for a probe request packet during the discovery window;
saving information relating to received probe request packets; and
sending a probe response packet if the wireless device has not sent a probe response packet or a beacon packet in the current discovery window.

11. A wireless portable media player device as defined in claim 8, wherein the instructions further include instructions for:
turning on the radio during the discovery window, in response to activation of an active discovery mode;
sending a broadcast request packet during the discovery window; and
saving information contained in response packets sent by other wireless devices in response to the broadcast request packet.

12. A wireless portable media player device as defined in claim 8, wherein the instructions further include instructions for:
turning on the radio during the discovery window, in response to a connect call;
sending a connection request packet to a second wireless device during the discovery window;
if a connection response packet is received within the discovery window, establishing a connection to the second wireless device; and
if a connection response packet is not received within the discovery window, indicating a connection failure.

13. A wireless portable media player device as defined in claim 8, wherein the instructions further include instructions for:
receiving a connection request packet during the discovery window;
if the connection request packet is accepted, sending a connection response packet during the discovery window; and
if the connection request packet is not accepted, dropping the connection request packet and remaining in a current state.

14. A wireless portable media player device as defined in claim 8, wherein the data includes music data for the portable media player device.

15. A computer-readable storage device programmed with instructions for executing a method to operate a wireless device, comprising:
performing passive discovery operations on a discovery channel by the wireless device during a discovery window of a periodic discovery interval, the passive discovery operations enabling discovery by neighbor wireless devices and discovering neighbor wireless devices passively;

switching from the discovery channel to a data channel when the discovery window of the periodic discovery interval ends;

sending a data announcement packet on the data channel during a data window of the periodic discovery interval;

sending data on the data channel during the data window of the periodic discovery interval following transmission of the data announcement packet;

operating the wireless device, during the periodic discovery interval, with a short data transfer window followed by a power save mode, in which a radio of the wireless device is turned off, when a power save data transfer mode is selected;

operating the wireless device, during the periodic discovery interval, with a long data window when a high speed data transfer mode is selected; and alternating between the discovery channel used for the discovery window and the data channel used for the data window, wherein passive discovery and data transfer are performed concurrently, and power is saved when the power save data transfer mode is selected.

16. A computer-readable storage device as defined in claim 15, wherein the method further comprises:

turning on a radio of the wireless device in response to activation of wireless operation;

listening for a beacon packet for a specified time;

if a beacon packet is received in the specified time, adjusting timing of the discovery window in accordance with parameters in the received beacon packet; and if a beacon packet is not received in the specified time, sending a beacon packet.

17. A computer-readable storage device as defined in claim 15, wherein the method further comprises:

turning on a radio of the wireless device during the discovery window, in response to activation of a passive discovery mode;

listening for a beacon packet for a random back-off time;

if a beacon packet is received within the random back-off time, adjusting timing of the discovery window in accordance with parameters in the received beacon packet;

if a beacon packet is not received within the random back-off time, sending a beacon packet;

listening for a probe request packet during the discovery window;

saving information relating to received probe request packets; and sending a probe response packet if the wireless device has not sent a probe response packet or a beacon packet in the current discovery window.

18. A computer-readable storage device as defined in claim 15, wherein the method further comprises:

turning on a radio of the wireless device during the discovery window, in response to activation of an active discovery mode;

sending a broadcast request packet during the discovery window; and saving information contained in response packets sent by other wireless devices in response to the broadcast request packet.

19. A computer-readable storage device as defined in claim 15, wherein the method further comprises:

turning on a radio of the wireless device during the discovery window, in response to a connect call;

sending a connection request packet to a second wireless device during the discovery window;

if a connection response packet is received within the discovery window, establishing a connection to the second wireless device; and if a connection response packet is not received within the discovery window, indicating a connection failure.

20. A computer-readable storage device as defined in claim 15, wherein the data includes music data for a portable media player device.

\* \* \* \* \*